(12) United States Patent
Aubert

(10) Patent No.: US 8,873,613 B2
(45) Date of Patent: Oct. 28, 2014

(54) DETECTION PROCESS FOR A RECEIVER OF A WIRELESS MIMO COMMUNICATION SYSTEM

(75) Inventor: Sebastien Aubert, Nice (FR)

(73) Assignee: St-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/988,574

(22) PCT Filed: Nov. 29, 2011

(86) PCT No.: PCT/EP2011/005971
§ 371 (c)(1),
(2), (4) Date: May 21, 2013

(87) PCT Pub. No.: WO2012/072228
PCT Pub. Date: Jun. 7, 2012

(65) Prior Publication Data
US 2013/0243068 A1    Sep. 19, 2013

Related U.S. Application Data

(60) Provisional application No. 61/432,820, filed on Jan. 14, 2011, provisional application No. 61/488,461, filed on May 20, 2011.

(30) Foreign Application Priority Data

Nov. 30, 2010   (EP) ..................................... 10368044
May 12, 2011    (EP) ..................................... 11368018

(51) Int. Cl.
*H04B 1/00*    (2006.01)
(52) U.S. Cl.
USPC .............................. 375/232; 375/229; 375/230
(58) Field of Classification Search
USPC ......................................................... 375/232
See application file for complete search history.

(56) References Cited

U.S. PATENT DOCUMENTS

| 7,720,169 B2 * | 5/2010 | Reuven et al. ................ 375/267 |
| 7,945,008 B2 * | 5/2011 | Milliner et al. ............... 375/367 |

(Continued)

OTHER PUBLICATIONS

International Search Report issued in corresponding International application No. PCT/EP2011/005971, date of mailing Mar. 14, 2012.

(Continued)

*Primary Examiner* — Erin File
(74) *Attorney, Agent, or Firm* — Patent Portfolio Builders PLLC

(57) ABSTRACT

A detection process for a receiver of a wireless communication system based on Multiple-In-Multiple-Out antennas, the process involving: —a preprocessing which only depends on the channel H, said preprocessing involving: —A QRD decomposition (61) for the purpose of decomposing said channel H into two Q and R matrices, with $Q^H Q=I$ and R being upper triangular; —a lattice reduction (62) for the purpose of generating (formula AA, formula BB) and a permutation matrix T; —a loading phase (63, 64, 65) comprising a linear LRA-Minimum-Mean-Square-Error equalization applied on said symbols y in accordance with the result of said lattice reduction for the purpose of generating a value (formula CC). The process is characterized by the fact that it further involves the steps of: —Performing a neighborhood search with a search center being equal to the result (formula CC) of said lattice reduction; —Determining the -BKest symbols in accordance with a Partial Euclidean Distance (PED) defined in accordance with the following formula (formula DD)—detecting each layer and with the result of said detection performing an update of the search center so as to perform detection of the next layer; —multiplying the estimated value (formula EE) by said matrix T plus quantizing it onto the original constellation so as to generate the estimated value (formula FF).

15 Claims, 14 Drawing Sheets

(56) References Cited

U.S. PATENT DOCUMENTS

| | | | |
|---|---|---|---|
| 8,179,992 B2* | 5/2012 | Seyama | 375/267 |
| 8,467,466 B2* | 6/2013 | Bjerke et al. | 375/262 |
| 8,520,759 B2* | 8/2013 | Kim et al. | 375/267 |
| 8,559,543 B1* | 10/2013 | Lee et al. | 375/267 |
| 8,638,887 B1* | 1/2014 | Choi et al. | 375/341 |
| 2005/0135498 A1* | 6/2005 | Yee | 375/267 |
| 2008/0019262 A1* | 1/2008 | Lillie et al. | 370/208 |
| 2008/0043864 A1* | 2/2008 | Fujii | 375/260 |
| 2008/0049863 A1* | 2/2008 | Heiskala | 375/267 |
| 2008/0101509 A1* | 5/2008 | Han et al. | 375/346 |
| 2008/0112504 A1* | 5/2008 | Jiang et al. | 375/296 |
| 2008/0153444 A1 | 6/2008 | Chen et al. | |
| 2008/0198943 A1* | 8/2008 | Milliner et al. | 375/267 |
| 2008/0279298 A1* | 11/2008 | Ben-Yishai et al. | 375/261 |
| 2008/0317141 A1* | 12/2008 | Burg et al. | 375/260 |
| 2009/0003476 A1* | 1/2009 | Rog et al. | 375/260 |
| 2009/0080508 A1* | 3/2009 | Gore et al. | 375/232 |
| 2009/0154599 A1* | 6/2009 | Siti et al. | 375/320 |
| 2009/0252242 A1* | 10/2009 | Kim et al. | 375/260 |
| 2010/0150279 A1* | 6/2010 | Arar | 375/340 |
| 2011/0264721 A1* | 10/2011 | Patel et al. | 708/209 |
| 2012/0114058 A1* | 5/2012 | Gan et al. | 375/267 |
| 2013/0301749 A1* | 11/2013 | Aubert et al. | 375/267 |

OTHER PUBLICATIONS

Wubben, D. et al., "Near-Maximum-Likelihood Detection of MIMO Systems Using MMSE-Based Lattice-Reduction," 2004 IEEE International Conference on Communications, ICC 2004, Jun. 20-24, 2004, Paris, IEEE Operations Center, Piscataway, NJ, USA, vol. 2, Jun. 20, 2004, pp. 798-802, XP010710431, DOI: 10.1109/ICC.2004.1312611, ISBN: 978-0-7803-8533-7.

Huang, Xinming et al., "System Architecture and Implementation of MIMO Sphere Decoders on FPGA," IEEE Transactions on Very Large Scale Integration (VLSI) Systems, IEEE Service Center, Piscataway, NJ USA, vol. 16, No. 2, Feb. 1, 2008, XP011199260, DOI: 10.1109/TVLSI.2007.912042.

Aubert, Sebastien et al., "Complexity Gain of QR Decomposition Based Sphere Decoder in LTE Receivers," Vehicular Technology Conference Fall (VTC 2009-Fall), 2009 IEEE 70th, IEEE, Piscataway, NJ, USA, Sep. 20, 2009, pp. 1-5, XP031600360, ISBN: 978-1-4244-2514-3.

Aubert, Sebastien et al., "Parallel QR Decomposition in LTE-A Systems," 2010 IEEE Eleventh International Workshop on Signal Processing Advances in Wireless Communications (SPAWC), Piscataway, NJ, USA, Jun. 20, 2010, pp. 1-5, XP031837466, ISBN: 978-1-4244-6990-1.

E.-U. Technical Specification Group RAN, "36.101 Equipment (UE) Radio Transmission and Reception v8.8.0," Tech. Rep., Sep. 2009 (also reachable at http://www.3gpp.org/ftp/Specs/archive/36_series/36.101/36101-880.zip).

B.M. Hochwald, and S. Ten Brink, "Achieving near-capacity on a multiple-antenna channel," Communications, IEEE Transactions on, vol. 51, No. 3, pp. 389-399, Mar. 2003.

T. Cui, and C. Tellambura, "An efficient generalized sphere decoder for rank-deficient MIMO systems," Communications Letters, IEEE, vol. 9, No. 5, pp. 423-425, May 2005.

L. Wang, L. Xu, S. Chen, and L. Hanzo, "MMSE Soft-Interference-Cancellation Aided Iterative Center-Shifting K-Best Sphere Detection for MIMO Channels," Communications, IEEE International Conference on, pp. 3819-3823, May 2008.

X.-F. Qi, and K. Holt, "A Lattice-Reduction-Aided Soft Demapper for High-Rate Coded MIMO-OFDM Systems," Signal Processing Letters, IEEE, vol. 14, No. 5, pp. 305-308, May 2007.

K.-W. Wong, C.-Y. Tsui, S.-K. Cheng, and W.-H. Mow. "A VLSI Architecture of a K-Best Lattice Decoding Algorithm for MIMO Channels," Circuits and Systems, IEEE International Symposium on, vol. 3, pp. 273-276, May 2002.

J. Jalden, and P. Elia, "LR-aided MMSE lattice decoding is DMT optimal for all approximately universal codes," Information Theory, IEEE International Symposium on, pp. 1263-1267, Jun. 2009.

E.-U. Technical Specification Group RAN, "36.101 User Equipment (UE) radio transmission and reception v8.8.0," Tech. Rep., Sep. 2009. The related parts are A.3.3.1, in particular table A.3.3.1-3 for high modulation (64-QAM), and B.2.3 for spatial correlation.

X. Wang, Z. He, K. Niu, W. Wu, and X. Zhang, "An Improved Detection Based on Lattice Reduction in MIMO Systems," Personal, Indoor and Mobile Radio Communications, IEEE International Symposium on, pp. 1-5, Sep. 2006.

* cited by examiner

DETECTION PROCESS FOR A RECEIVER OF A WIRELESS MIMO COMMUNICATION SYSTEM

TECHNICAL FIELD

The invention relates to the field of wireless communication and more particularly to a process for performing near-ML detection in a receiver of a wireless MIMO communication system.

BACKGROUND ART

Wireless communications based on multiple antennas is a very promising technique which is subject to extensive investigations so as to take into advantage of the significant increase of data rate which may be obtained by such technique.

FIG. 1 illustrates a basic 2×2 multiple-Input Multiple Output (MIMO) spatial multiplexing communication between an emitter 10 and a receiver 20, and the processing of a single data flow—represented by reference 1—which is divided into two distinctive data streams 2 and 3 by means of a multiplexer 15 and each subflows are then being processed by a respective modulator and RF circuit (resp. 13 and 14) before being conveyed to two transmit antennas 11 and 12.

On the receiver side, two antennas 21 and 22 provides two RF signals which are received by receiver 20 which performs RF reception, demodulation and then detection of the two data streams before multiplexing it into one single data stream.

The MIMO configuration allows to get rid of the different obstacles (such as represented by obstacles 28 and 29 in figures) and thus increase the data rate of the communication.

Now considering the receiver of the communication, let us introduce a $n_T$-transmit and $n_R$-receive $n_T \times n_R$ MIMO system model such as: y=Hx+n, where y is the receive symbols vector, H the channel matrix, x the transmit symbols vector and n an additive white Gaussian noise.

Reduction of complexity in the MIMO detection can be achieved both by means of Sphere Decoders techniques or lattice reductions.

A first well known technique for finding the optimal Maximum Likelihood (ML) estimate $\hat{x}_{ML}$ by avoiding an exhaustive search is to examine only the lattice points that lie inside a sphere. This solution is denoted as the Sphere Decoder (SD) technique and, starting from the conventional ML equation $$\hat{x}_{ML} = \underset{x \in \mathcal{E}^{n_T}}{\operatorname{argmin}} \|y - Hx\|^2, \text{ it reads:} \quad (1)$$

$$\hat{x}_{SD} = \operatorname{argmin} \|Q^H y - Rx\|^2 \le d^2,$$

where H=QR, with the classical QR Decomposition (QRD) definitions, and d is the sphere constraint.

The SD principle has been introduced and leads to numerous implementation problems. In particular, it is a NP-hard problem. This aspect has been partially solved through the introduction of an efficient solution that lies in a Fixed Neighbourhood Size Algorithm (FNSA), commonly denoted as the K-Best, which offers a fixed complexity and a parallel implementation, thus making possible an implementation. However, this solution makes the detector to be sub-optimal since its leads to a performance loss compared to the ML detector. It is particularly true in the case of an inappropriate K according to the MIMO channel condition number, since the ML solution might be excluded from the search tree.

Since the complexity is fixed with such a detector, the exposed optimizations will induce a performance gain for a given neighbourhood size or a reduction of the neighbourhood size for a given Bit Error Rate (BER) goal. Common existing optimizations in the FNSA performance improvement are in particular the use of the Sorted QRD (SQRD) at the pre-processing step, and the Schnorr-Euchner (SE) enumeration strategy and the dynamic K-Best at the detection step.

However, although a neighbourhood sourly remains the one and only solution that achieves ML performance, it may lead to the use of a large size neighbourhood scan which would correspond to a dramatic increase of the computational complexity. This point is particularly true in the case of high order modulations.

Also, the SD must be fully processed for each transmit symbols vector detection over a given channel realization. A computational complexity reduction through adjacent-channel information re-use is not possible, even if the channel may be considered as constant over a certain block code size. Consequently, due to the SD's principle itself, the skilled man would have noticed the necessity of the computational complexity reduction of any SD-like detector for making it applicable in the LTE-A context.

A second technique which can be used for achieving near-ML performance is based on lattice reduction.

Document "*Near-Maximum-Likelihood Detection of MIMO Systems using MMSE-Based Lattice-Reduction,*" by Wübben, R. Böhnke, V. Kühm, and K.-D. Kammeyer, Communications, IEEE International Conference on, vol. 2, pp. 798-802, 2004 discloses the use of Lattice Reduction for the purpose of improving the conditioning of the channel matrix H and improving the efficiency of the detection process.

In particular the cited prior art document discloses the combination of a preprocessing phase depending on the channel followed by a linear MMSE equalization of the received symbols y.

In Wubben et al, the preprocessing phase comprises, in order to significantly reduce of the computational complexity the following steps:

1) apply a sorted and also extended QR decomposition of the matrix H (With $Q^H Q=I$ and R being upper triangular) so as to generate $Q_{ext}$ and $R_{ext}$ matrices which take into account the level of SINR (Signal to Interference and noise ratio) for the purpose of detecting first the layers having the best SINR ratio. In addition, the <<extended>> QR decomposition leads to the taking into account of the noise variance $\sigma^2$ so as to improve the performance of the detection.

2) apply a lattice reduction algorithm—such as a Lenstra-Lenstra-Lovàsz algorithm) on the resulting SQRD decomposition so as to generate a matrix $$\tilde{H}=HT$$

and to introduce a new vector $Z=T^{-1}x$ which results in $$y=Hx+n=HTT^{-1}x+n=\tilde{H}z+n$$

3) then processing the received symbols y by applying a MMSE linear detection on the resulting channel matrix $\tilde{H}$ or even a Successive-Interference cancellation based on the conventional equation $$\hat{x}_{SIC} = \underset{x \in \xi^{n_T}}{\mathrm{argmin}} \|Q^H y - Rx\|^2.$$

The preprocessing phase suggested by Wübben of al. yields to both some efficiency for reducing the computational complexity of the detection process and some performance improvement.

However, the overall performance shows to be still far from the ideal ML-detection and it is therefore desirable to improve such preprocessing by an additional processing phase which significantly increases the performance of the detection while limiting the processing resources being required with the classical K-Best.

SUMMARY OF THE INVENTION

It is an object of the present invention to carry out a process of detection for a MIMO receiver which achieves near-ML performance while limiting complexity of the algorithm.

It is another object of the present invention to achieve a MIMO detection process for a wireless communication signal which combines effective SQRD decomposition, lattice reduction and a subsequent neighborhood search process for the purpose of achieving detection close to the Maximum Likelihood detection.

It is a further object of the present invention to achieve a new near-ML Sphere Detector for a Wireless MIMO receiver, that is centered—to the best of the authors' knowledge—on the best pseudo-linear solution and which takes advantage of the Lattice Reduction and also implies the use of small RDN scans for achieving the ML hard-decision performance, thus making the RDN study size independent on the order of the constellation.

It is another object of the present invention to achieve a receiver for a MIMO wireless communication system which incorporates effective mechanism of SQRD decomposition, lattice reduction as well as an efficient neighborhood search mechanism.

It is an additional object of the present invention of providing an efficient metric computation, which make the search phase to be done efficiently, thus providing a performance gain for a given computational complexity.

These and other objects of the invention are achieved by means of a detection process for a receiver of a wireless communication system based on Multiple-In-Multiple-Out antennas, the process involving:
  a preprocessing phase which only depends on the channel H, said preprocessing involving:
    A SQRD decomposition for the purpose of decomposing said channel H in its extended version H into two Q and R matrices, with $Q^H Q = I$ and R being upper triangular;
    a lattice reduction for the purpose of generating $\tilde{Q}, \tilde{R}$ and a permutation matrix T;
  a loading phase comprising a linear LRA equalization applied on said symbols y in accordance with the result of said lattice reduction for the purpose of generating a value $\tilde{z}$.

The process is characterized by the fact that it further involves the steps of performing a neighborhood search with a search center being equal to the result $\tilde{z}$ of said lattice reduction. Then the K-Best symbols are computed in accordance with a Partial Euclidian Distance (PED) defined in accordance with the following formula:

$$\|\tilde{R}(\tilde{z}-z)\|^2 \leq d^2$$

Each layer can thus be detected, and each detected layer causes the update of the search center for the purpose of detecting the next layer.

When the estimation of $\tilde{z}$ is achieved, the latter is multiplied by the matrix T then mapped onto the original constellation so as to generate the estimated value $\tilde{x}$.

In one embodiment, an extended model is applied for both the matrix H and the received symbol y in accordance with the formula below:

$$H_{ext} = \begin{bmatrix} H \\ \sigma I \end{bmatrix} \text{ and } y_{ext} = \begin{bmatrix} y \\ 0 \end{bmatrix}$$

with H being the channel matrix, σ being the noise standard deviation, I being the identity matrix.

In one embodiment, the Lattice Reduction is based on the Lenstra-Lenstra-Lovasz (LLL) algorithm.

In one particular embodiment, the SQRD decomposition is a sorted QRD decomposition, with the rows of said upper triangular matrix that are sorted in accordance with the level of the Signal-to-Interference and Noise Ratio (SINR), said SQRD decomposition issuing $Q_{ext}$, $R_{ext}$ and a permutation matrix P.

The invention also achieves a Receiver for a wireless communication system based on Multiple-In-Multiple-Out antennas, said receiver processing observations symbols y derived from symbols x transmitted by an emitter through a channel H; is said receiver which comprises:
  means for performing a preprocessing which only depends on the channel H and which further comprises:
    means for performing a QRD decomposition for the purpose of decomposing said channel H into two Q and R matrices, with $Q^H Q = I$ and R being upper triangular;
    means for performing a lattice reduction for the purpose of generating Qext, Rext and a permutation matrix T;
  means for performing a loading phase comprising a linear LRA-Minimum-Mean-Square-Error equalization applied on said symbols y in accordance with the result of said lattice reduction for the purpose of generating a value $\tilde{z}$.

The receiver further comprises:
  means for performing a neighborhood search with a search center being equal to the result $\tilde{z}_{LRA-MMSE}$ of said lattice reduction;
  means for determining the K-Best symbols in accordance with a Partial Euclidean Distance (PED) defined in accordance with the following formula:

$$\|\tilde{R}(\tilde{z}-z)\|^2 \leq d^2$$

means for detecting each layer and with the result of said detection performing an update of the search center so as to perform detection of the next layer;
  means for multiplying the estimated value $\hat{z}$ by said matrix T so as to generate the estimated value $\hat{x}$ through a final quantization step.

In one embodiment, the preprocessing phase is applied on an extended model of the matrix H defined in accordance with the following formula:

$$H_{ext} = \begin{bmatrix} H \\ \sigma I \end{bmatrix} \text{ and } y_{ext} = \begin{bmatrix} y \\ 0 \end{bmatrix}$$

With H being the channel matrix, σ being the standard deviation, I being the identity matrix.

Preferably, the lattice reduction is based on a Lenstra-Lenstra-Lovasz (LLL) algorithm.

DESCRIPTION OF THE DRAWINGS

Other features of one or more embodiments of the invention will be best understood by reference to the following detailed description when read in conjunction with the accompanying drawings.

FIGS. 4-5a and 5b illustrate functional block of one particular embodiment.

DESCRIPTION OF THE PREFERRED EMBODIMENT

Figure 1:
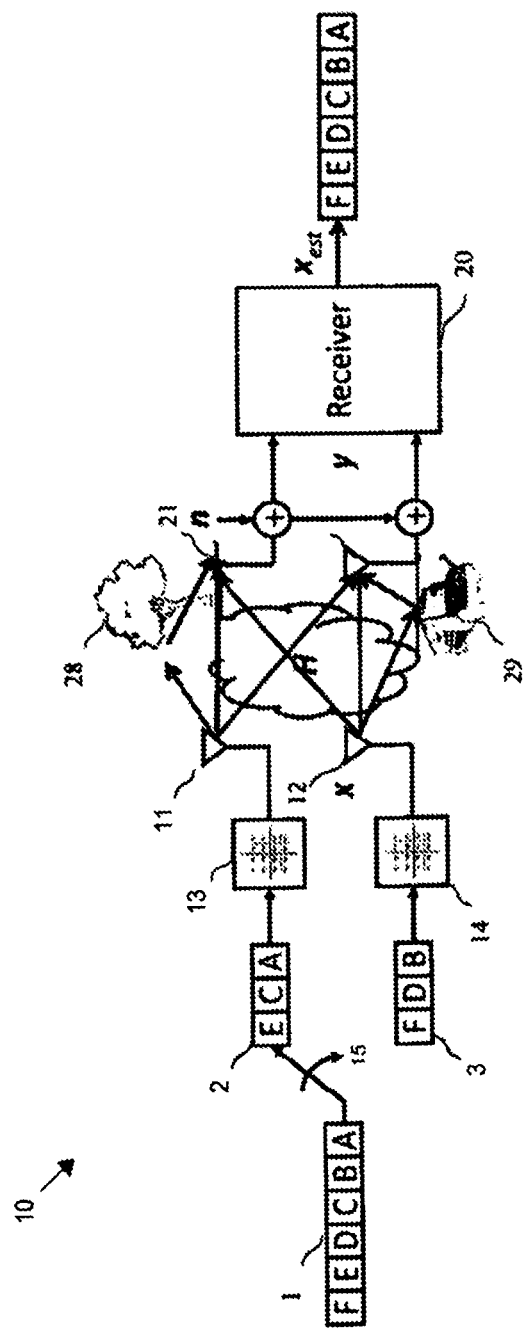
FIG. 1 illustrates a basic 2×2 multiple-Input Multiple Output (MIMO) spatial multiplexing communication
Figure 2A:
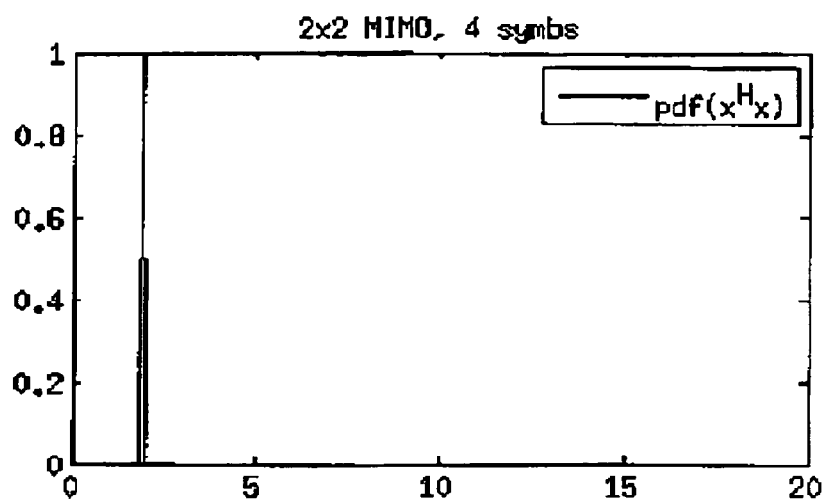
FIGS. 2A-2I illustrate the Probability Density Function (PDF) of the transmit signal power for all the possible symbols vectors, 2×2, 4×4 and 8×8 complex Rayleigh channel, QPSK, 16-QAM and 64-QAM modulations on each layer.
Figure 2B:
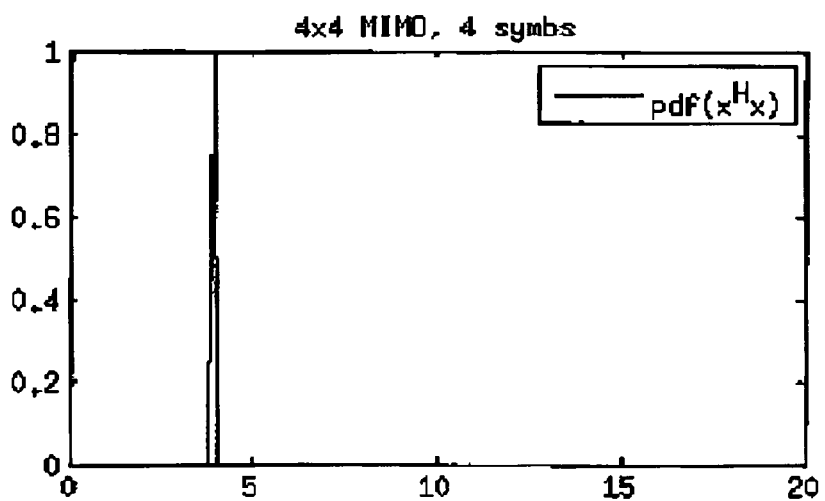
Figure 2C:
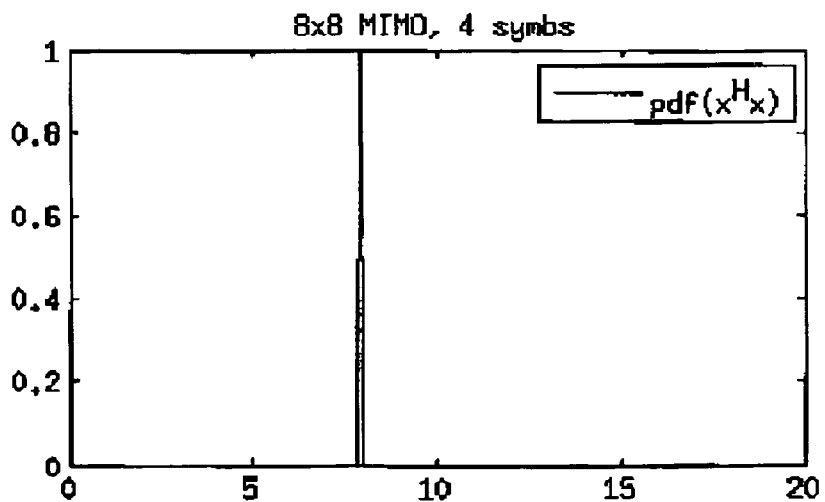
Figure 2D:
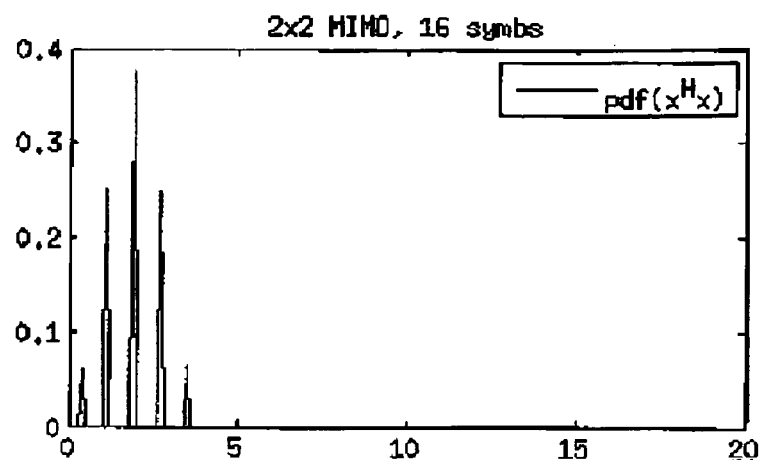
Figure 2E:
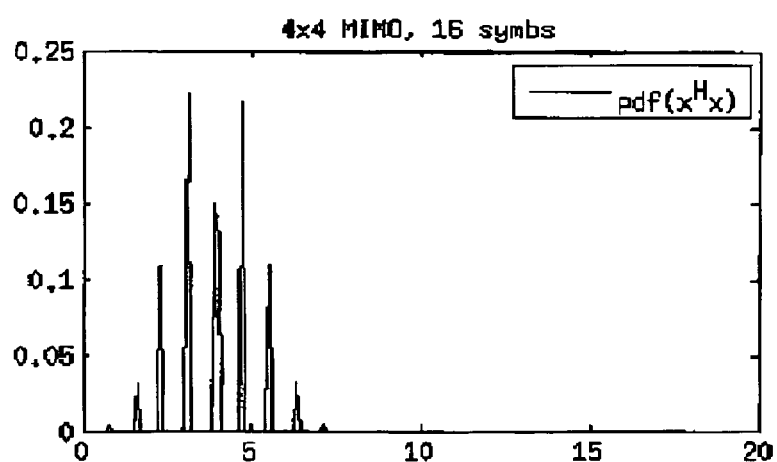
Figure 2F:
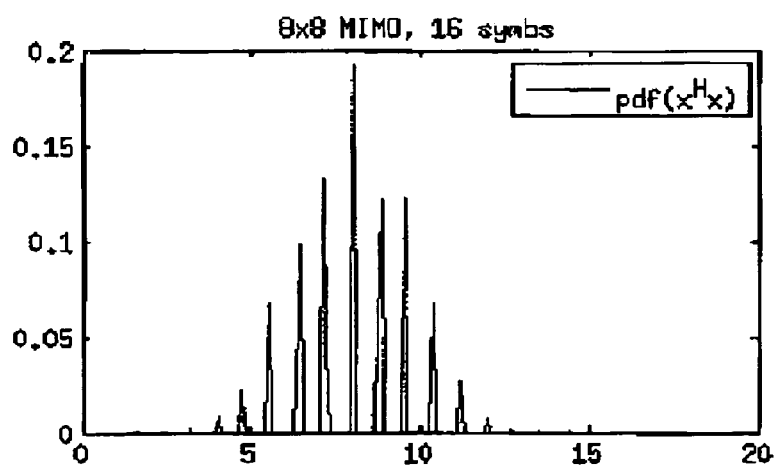
Figure 2G:
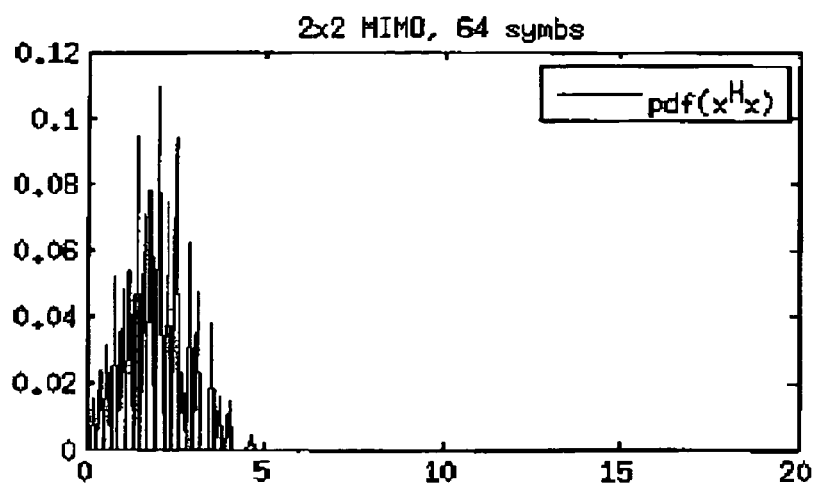
Figure 2H:
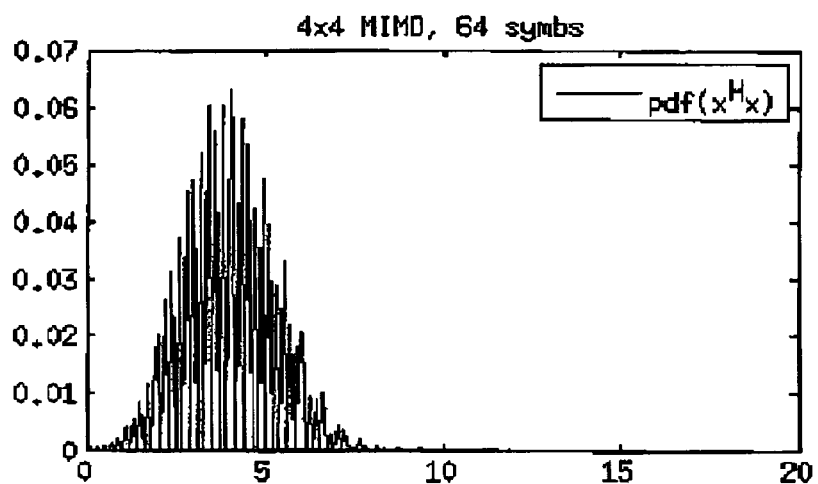
Figure 2I:
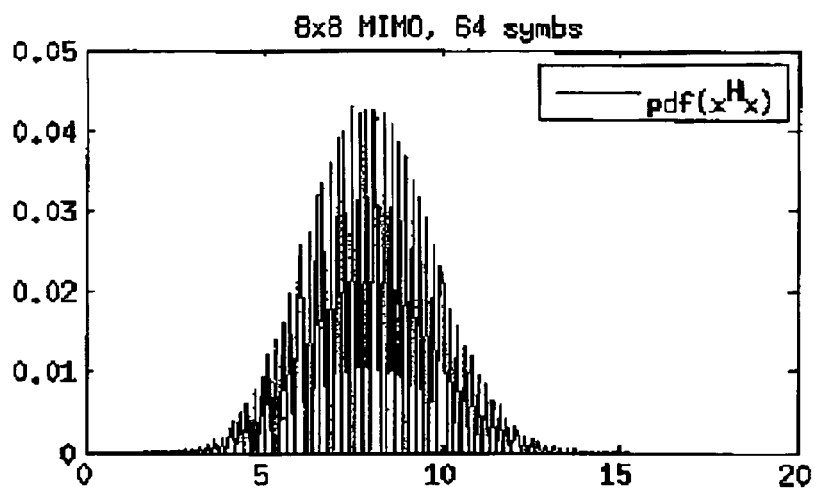

There will now be described one particularly embodiment of a process which is adapted to carry out a receiver for a MIMO wireless communication system, such as a Orthogonal Frequency Division Multiplex (OFDM).

In order to clarify the description of the process (II), some theoretical considerations will be introduced first (I).

I. Theoretical Considerations

The conventional and basic Sphere Detector is based on the Equation (1)—recalled above—which is centered on the received signal y.

In the case of a depth-first search algorithm, the Babai point is defined as the first solution that is given by the algorithm. For such conventional system, the induced Babai point is implicitly a Zero Forcing-Successive Interference Canceller (ZF-SIC) and, in the case of a Fixed Neighborhood Size Algorithm (FNSA), this definition is extended and is considered as the solution that would be directly reached, with no neighborhood study.

In opposition with the above mentioned Babai point, another relevant concept is the sphere search centre $x_C$, namely the distance calculation in any equation of the form $\|x_C - x\|^2 \leq d^2$, where x is any possible signal, which is consistent with the equation of an $(n_T-1)$ sphere.

The embodiment which will be described in the process below, is based on the fixing of an appropriate search center which induces an already close-to-optimal Babai point, in other words a solution that is already close to the ML solution.

By fixing such a search center, the process described below offers the ML diversity but a tiny SNR offset even with an odered pseudo-linear equalization, which is to the best of the authors' knowledge the best pseudo-linear equalization in term of performance. It has been discovered that, by selection of an appropriate search center, the neighbourhood scan size can be significantly decreased while still reaching the ML estimate. In the case of a FNSA detector having a fixed neighbourhood size, it will yield a performance improvement for a given neighbourhood size or a reduction of the neighbourhood size for a given BER goal.

To achieve such performance, an equivalent metric has been defined (the definition following hereinafter) and show efficiency for the case of the Minimum Mean Square Error (MMSE)-SIC Babai point with an Original Domain Neighbourhood (ODN) $\xi^{n_T}$ study discussed in the following three references [1], [2] and [3].

Also, it has been implicitly done for the Lattice Reduction Aided (LRA)-ZF-SIC Babai point with a Reduced Domain Neighbourhood (RDN) $\tilde{z}_c^{n_T}$ study in [4].

This makes the layers in the symbols vector close to be independent and consequently reduce the interest of scanning a large neighbourhood in both the reduced and original domains to achieve the ML performance.

Therefore, there is achieved a new near-ML SD that can be advantageously centred on the best pseudo-linear solution that takes advantage of the LR-aid. The RDN study implies the use of small RDN and ODN scans for achieving the ML hard-decision performance and makes the ODN study size independent of the constellation order.

For the sake of clarity, one will now discuss different possible sphere centres.

A) ZF-SIC Babai Point, Original Domain Neighborhood

The known Sphere Decoder (SD) expression may be rearranged, leading to an exact formula that has been firstly proposed by Wong et al [5] aiming at allowing optimizations for a VLSI implementation through an efficient Partial Euclidean distance (PED) expression and early pruned nodes [5]:

$$\hat{x}_{SIC-ZF} = \arg\min \|Re_{ZF}\|^2, \quad (2)$$

where $e_{ZF} = x_{ZF} - x$ and $x_{ZF} = (H^H H)^{-1} H^H y$.

Equation (2) clearly exhibits the point that the conventional and basic SD is unconstrained ZF-centred and implicitly corresponds to a ZF-SIC procedure with an ODN study at each layer. It can be noticed that, in the case of a large ODN study, the ML performance is achieved since the computed metrics are exactly the ML metrics.

B) MMSE-SIC Babai Point, ODN Study

Another solution could be based on the choice of a closer-to-ML Babai point than the ZF-SIC, which is the case of the MMSE-SIC solution.

For sake of clearness with definitions, we say that two ML equations are equivalent if the lattice points argument outputs of the minimum distance are the same, even in the case of different metrics. Two ML equations are equivalent if:

$$\arg\min_{x \in \mathbb{Z}^{n_T}}\{\|y-Hx\|^2\} = \arg\min\{\|y-Hx\|^2 + c\} \quad (3)$$

where c is a constant.

In that respect, one may observe that Cui et al. [reference 2] proposed a general equivalent minimization problem: $\hat{x}_{ML} = \arg\min\{\|y-Hx\|^2 + ax^H x\}$, by noticing that signals X have to be of constant modulus. Clearly, this assumption is respected in the case of QPSK modulations but is not directly applicable to 16-QAM and 64-QAM modulations, even if this assumption is not limiting since a QAM constellation can be considered as a linear sum of QPSK points [See reference 2 above 2].

Such expression has been applied to the FNSA by Wang et al. in the case of the unconstrained MMSE-centre which leads to a MMSE-SIC procedure with an ODN study at each layer [See reference 3 above]. In this case, the equivalent ML equation reads:

$$\hat{x}_{MMSE-SIC} = \arg\min(x_{MMSE}-x)^H(H^H H + \sigma^2 I)(x_{MMSE}-x) \quad (4)$$

Through the use of the Cholesky Factorization (CF) of $H^H H + \sigma^2 I = U^H U$ in the MMSE case ($H^H H = U^H U$ in the ZF case), the ML expression equivalently rewrites:

$$\hat{x}_{SIC} = \arg\min\{\|U(\tilde{x}-x)\|^2\} \quad (5)$$

where U is upper triangular with real diagonal elements and $\tilde{x}$ is any (ZF or MMSE) unconstrained linear estimate.

In [3], the authors discuss that when $n_T$ is large, the constant modulus signal assumption becomes the time average of the $n_T x_i$ entries. As depicted in FIG. 2, where the Probability Density Functions (PDF) of $x^H x$ are given for multiple number of transmit antennas and multiple modulations and due to the weak law of large numbers, the term is Gaussian centred to a mean value that is constant in time.

Consequently, the assumption may still be considered as fulfilled as $n_T$ increases. However, the detector robustness to this approximation must be checked by simulations, which is done in the FIG. 9a-9b.

Nevertheless, in order to make the Equation (5) strictly equivalent to the ML metric, it is suggested to represent any M-QAM constellation as a weighted sum of QPSK constellations:

$$x^{(M-QAM)} = \sum_{i=0}^{\log_2\{M\}-1} 2^i \left(\frac{\sqrt{2}}{2}\right) x_i^{(QPSK)}| . \quad (6)$$

where $x^{(M-QAM)}$: is a $n_T$ symbols vector whose entries all belong to a M-QAM constellation and $x_i^{(QPSK)}|$ is a $n_T$ symbols vector whose entries all belong to a QPSK constellation.

C) LRA-ZF-SIC Babai Point, RDN Study

The classical LRA-FNSA shows to be implicitly unconstrained LRA-ZF-centred, which leads to a LRA-ZF-SIC procedure with a RDN study at each layer. The exact formula has not been clearly provided but is implicitly used by any LRA-FNSA [See reference 4] and may even be considered as an incremental extension of Equation (2):

$$\hat{z}_{LRA-ZF-SIC} = \underset{z \in \mathbb{Z}_C^{n_T}}{\arg\min} \|\tilde{R} e_{LRA-ZF}\|^2. \quad (7)$$

where $\tilde{R}$ is the LLL-based LR algorithm output, $e_{LRA-ZF} = z_{LRA-ZF} - z$, and $\mathbb{Z}_C^{n_T}$ is the $n_T$-dimensional infinite set of complex integers.

To the best of the author's knowledge, no convincing formula has been proposed until now. Even if Jalden et al. [6] proposed a LRA-MMSE-centred solution:

$$\hat{z}_{\alpha,ML} = \underset{z \in \mathbb{Z}_C^{n_T}}{\arg\min}\|\tilde{R}^{-1} R^{-\dagger} H^\dagger y - z\|^2 = \underset{z \in \mathbb{Z}_C^{n_T}}{\arg\min}\|z_{LRA-MMSE} - z\|^2 \quad (8)$$

the introduced metrics are not equivalent to the ML expression. The corresponding detector is a sub-optimal solution that consists in a RDN study around the unconstrained LRA-MMSE solution. The solution output in this will be the constrained LRA-MMSE solution plus a list of solutions in the neighbourhood, generated according to a non-equivalent metric, which would be subsequently re-ordered according to the exact ML metric. However, the list is not generated according to the correct distance minimization criterion and would not lead to a near-ML solution. Consequently, the proposed detector does not offer acceptable uncoded BER performance in the sense that it would not lead to a near-ML solution. In particular, the ML performance is not reached in the case of a large neighbourhood study.

In order to improve the detection process, it is now suggested to use an unconstrained LRA-MMSE-centre. One recalls that, as known by the skilled man the LRA-MMSE solution is given by the formula below $$\tilde{z}_{LRA-MMSE} = (\tilde{H}^H \tilde{H} + \sigma_n^2 T^H T)^{-1}\tilde{H}^H y.$$

which is also indicated in formula (16) of the Wubbens reference.

The LRA-MMSE center leads to a LRA-MMSE-SIC procedure with a RDN study at each layer. The equivalent ML equation reads:

$$\hat{z}_{LRA-SIC} = \arg\min\|\tilde{U}(\tilde{z}-z)\|^2 \quad (9)$$

Where $\tilde{H}^H \tilde{H} \sigma^2 T^H T = \tilde{U}^H \tilde{U}$ in the MMSE case ($\tilde{H}^H \tilde{H} = \tilde{U}^H \tilde{U}$ in the ZF case) and by noting that $\tilde{U}$ is upper triangular with real diagonal elements and $\tilde{z}$ is any LRA (ZF or MMSE) unconstrained linear estimate.

Proof: Let us introduce any term c' s.t. $\|y-\tilde{H}z\|^2 + c' = \|\tilde{U}(\tilde{z}-z)\|^2$, where $\tilde{z}$ is any LRA (ZF or MMSE) unconstrained linear estimate:

$$c' = \|\tilde{U}(\tilde{z}-z)\|^2 - \|y-\tilde{H}z\|^2$$
$$= (\tilde{z}-z)^H \tilde{U}^H \tilde{U}(\tilde{z}-z) - (y-\tilde{H}z)^H(y-\tilde{H}z)$$
$$= \tilde{z}^H \tilde{G}\tilde{z} - \tilde{z}^H \tilde{G}z - z^H \tilde{G}\tilde{z} + z^H \tilde{G}z - y^H y + y^H \tilde{H}z +$$
$$z^H \tilde{H}^H y - z^H \tilde{H}^H \tilde{H}z$$

with $$\tilde{U}^H \tilde{U} = \tilde{G}$$
$$= y^H \tilde{H}\tilde{G}^{-1}\tilde{G}\tilde{G}^{-1}\tilde{H}^H y - y^H \tilde{H}\tilde{G}^{-1}\tilde{G}z - z\tilde{G}\tilde{G}^{-1}\tilde{H}^H y +$$
$$z^H \tilde{G}z - y^H y + y^H \tilde{H}z + z^H \tilde{H}^H y - z^H \tilde{H}^H \tilde{H}z$$

by introducing $\tilde{z}=\tilde{G}^{-1}\tilde{H}^H y|$ and $\tilde{z}^H=y^H\tilde{H}\tilde{G}^{-1}$, where $\tilde{G}=\tilde{H}^H\tilde{H}|$ in the LRA-ZF case and $\tilde{G}=\tilde{H}^H\tilde{H}+\sigma^2 T^H T$ in the LRA-MMSE case.

$$c' = y^H \tilde{H}\tilde{G}^{-1}\tilde{H}^H y + z^H \tilde{G}z - y^H y - z^H \tilde{H}^H \tilde{H}z$$
$$= y^H \tilde{H}\tilde{G}^{-1}\tilde{H}^H y + z^H(\tilde{G} - \tilde{H}^H \tilde{H})z - y^H y$$

$$c' = y^H \tilde{H}^H \tilde{G}^{-1}\tilde{H}^H y + z^H \tilde{G}z - y^H y - z^H \tilde{H}^H \tilde{H}z$$
$$= y^H \tilde{H}\tilde{G}^{-1}\tilde{H}^H y + z^H(\tilde{G} - \tilde{H}^H \tilde{H})z - y^H y$$

In the ZF case, $\tilde{H}\tilde{G}^{-1}\tilde{H}^H=\tilde{H}\tilde{H}^{-1}(\tilde{H}^H)^{-1}\tilde{H}^H=I$ and $\tilde{G}-\tilde{H}^H\tilde{H}=0|$, consequently $c'=0|$ is a constant term.

In the MMSE case, $c'=y^H(\tilde{H}(\tilde{H}^H\tilde{H}+\sigma^2 T^H T)^{-1}\tilde{H}^H-I)y+\sigma^2 z^H T^H Tz$ which is a constant term in x iff the signal x entries are of constant modulus since $\sigma^2 z^H T^H Tz=\sigma^2 x^H x|$.

The formula introduced in (9) offers an equivalent metric which is the same than the MMSE metric introduced in (5). The difference, and in particular the interest in the LRA case, relies on the neighbourhood study nature. In the case of a RDN study, the equivalent channel matrix $\tilde{H}$ is considered and is remembered to be only roughly, and not exactly, orthogonal. Consequently, the symbols vector x detection layer by layer, independently, does not exactly correspond to its joint detection since the mutual influence of the transformed z signal is still present. This discussion exhibits the interest of SD-like techniques to still improve such a detector performance but also makes the skilled man feel that for achieving the ML performance, the RDN study size would be smaller than an ODN study size.

LRA-MMSE-OSIC Babai Point, RDN Study

All the solutions rely on the use of the CF that is an efficient pre-processing solution, but only usable in the case of a formula in a factored form. Although it is the case in our context, most of the studies have been conducted in the case of the always applicable QRD. In particular, the advantageous SIC performance optimizations such as ordering according to the corresponding decreasing SNR (from $n_T$ to 1) in the ZF-SQRD case and SINR in the MMSE-SQRD case have been proposed [7]. Moreover, a computational complexity reduction of the LLL-based LR algorithm has been proposed [7].

In the embodiment described below, it will be suggested to introduce the QRD, and more particularly the sorted SQRD, in the (LRA-)MMSE-(O)SIC cases.

The MMSE criterion is introduced through the consideration of an extended system model [7], namely by introducing the $(n_R+n_r)\times n_r$ matrix $H_{ext}$ and the $(n_R+n_T)$ vector $y_{ext}$ such as:

$$H_{ext} = \begin{bmatrix} H \\ \sigma I \end{bmatrix} \text{ and } y_{ext} = \begin{bmatrix} y \\ 0 \end{bmatrix} \quad (10)$$

This way, the pre-processing step is similar to the ZF-SQRD and the detection procedure equals that of LRA-ZF-SIC. The SQRD interest lies in the ordering of the detection symbols that can be ordered as a function of their S(I)NR and consequently limit the error propagation in SIC procedures. It has been shown by Wübben et al. that the optimum order offers a performance improvement, even if the ML diversity is still not reached. However, once the ML diversity is achieved through a LRA technique, the performance may be significantly improved with this solution [7].

Thus the LRA-MMSE-OSIC corresponds, to the best of the author's knowledge, to the best pseudo-linear detector in the literature, in particular in the case of 4×4 MIMO systems with QPSK modulations on each layer [7]. However, it may be shown that this solution does not offer convenient hard decision performance in the case of a higher order modulation or/and a larger antennas system.

Let us introduce the following notations: $Q_{\xi n_T}\{.\}$ is the quantification operator in the original domain constellation, $$Q_{\tilde{z}_C^{n_T}}\{.\}$$

is the quantification operator in the reduced domain constellation, a is the power normalization and scaling coefficient (i.e. $2/\sqrt{2}$, $2/\sqrt{1}$, $2\sqrt{42}$, for QPSK, 16-QAM and 64-QAM constellations, respectively) and $d=\frac{1}{2}^{-1}[1+j, \ldots, 1+j]^T$ is a complex displacement vector.

Figure 3:
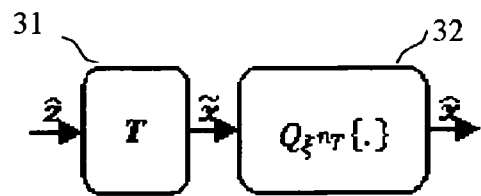
FIG. 3 illustrates the basic block diagram of any LRA procedure.
Figure 4:
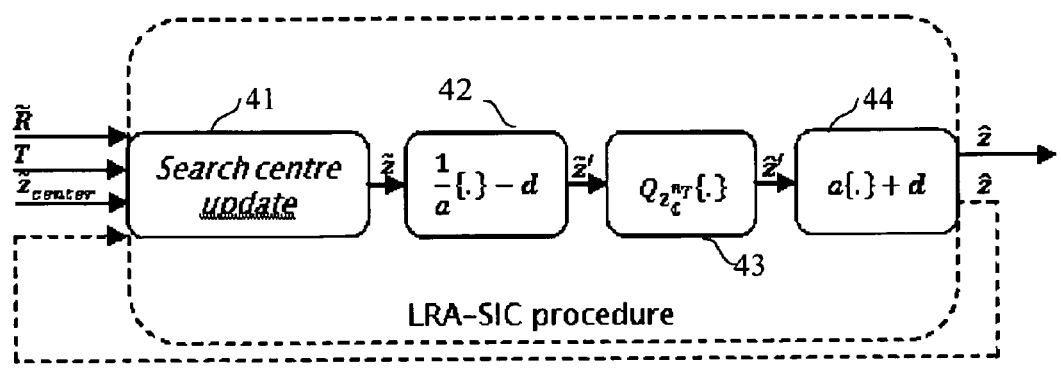
Figure 5A:
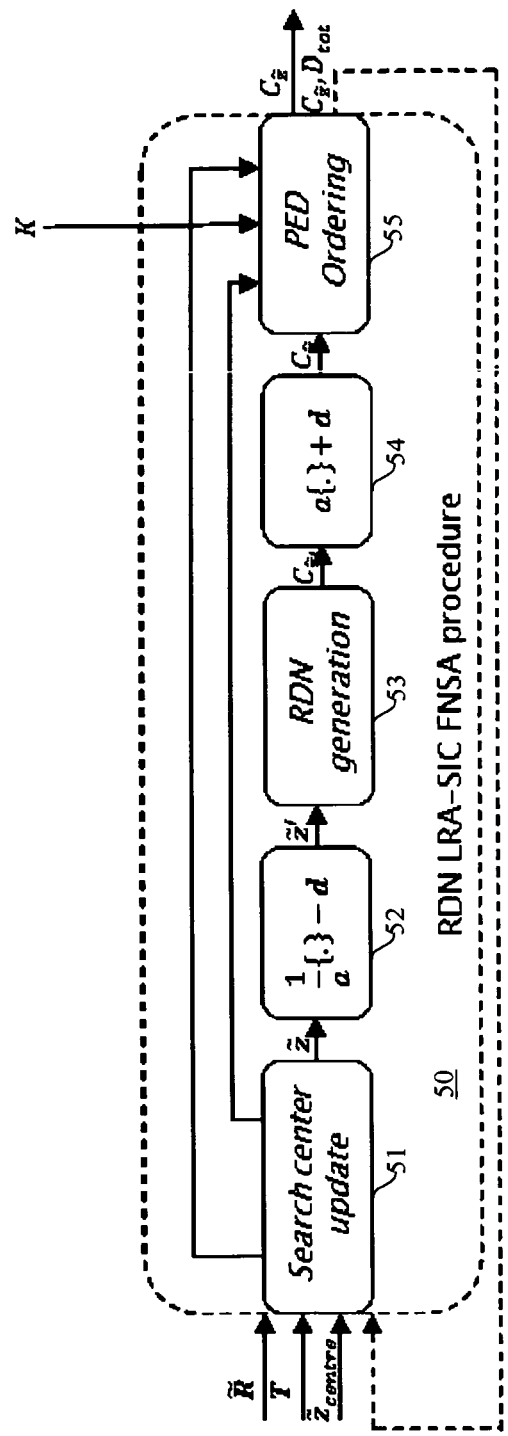
Figure 5B:
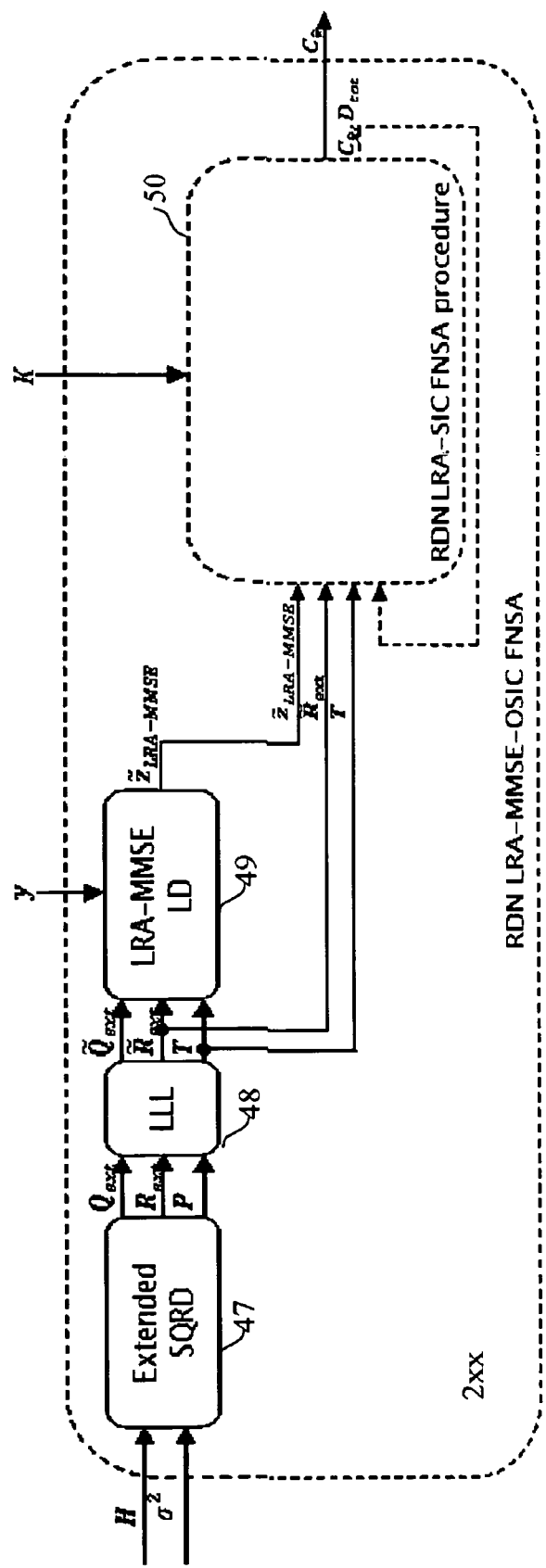

The RDN LRA-MMSE-OSIC centred solution block-diagram which is proposed in the embodiment described below is depicted in FIGS. 4, 5a and 5b with increasing levels of details, while FIG. 3 depicts the general principle of any LRA scheme, and particularly the mapping of any list of estimates in the reduced domain $C_{\tilde{z}}$ to the original domain $C_{\tilde{x}}$. As shown, the LRA scheme comprises a block 31 based on matrix T and a block 32 embodying the quantification operator in the reduced to constellation.

A LRA-SIC procedure, with no neighbourhood study, is described in FIG. 4. The search centre is updated at each layer by a block 41 (receiving $\tilde{R}$, $\tilde{z}_{center}$, T, and the $\hat{z}_{k+1\ int}$ estimates at previous layers): by considering the k-th layer and with the knowledge of the $\hat{z}_{k+1\ int}$ estimates at previous layers, the $\tilde{z}_k$ unconstrained Babai point can be provided and then has to be de-normalized and shifted by a block 42 to make it belonging to $\mathbb{Z}_C^{n_T}$. After quantization within the reduced constellation by block 43, and de-shifting and normalization by block 44, the $\hat{z}_k$ estimate at the k-th layer is obtained such as the next (k−1)-th layer can be considered, until the whole symbols vector is detected.

Starting from the LRA-SIC principle, a neighbourhood is considered at each layer and leads to the RDN LRA-SIC FNSA block 50, which is depicted in FIG. 5a, showing blocks 51-55. As above, blocks 51 and 52 respectively correspond to the Search center update and to the de-normalization and shifting block. In particular, the RDN generation is processed by a block 53 for bounded number of N possibilities and in a SE fashion, namely with ordered PEDs (block 55) according to an increasing distance from $\tilde{z}_k$ at each layer:

$$z_k = Q_{\tilde{z}_C^{n_T}}\{\tilde{z}_k\}, Q_{\tilde{z}_C^{n_T}}\{\tilde{z}_k\}+1, Q_{\tilde{z}_C^{n_T}}\{\tilde{z}_k\}+j,$$
$$Q_{\tilde{z}_C^{n_T}}\{\tilde{z}_k\}-1, Q_{\tilde{z}_C^{n_T}}\{\tilde{z}_k\}-j, \quad (1')$$

The SE strategy aims at finding the correct decision early, leading to a safe early termination criterion, which is not considered here for sake of readability in performance comparison. Also, all the corresponding PEDs are computed and then ordered. The K best solutions, namely with the lowest PED, in the reduced domain are stored ($C_{\tilde{z}}$) similarly to their corresponding Cumulative Euclidean Distances (CED) ($D_{tot}$)

The inputs/outputs of the different blocks are summarized as follows:

Block 51:
Inputs: $\tilde{R}$, T, $\tilde{z}_{center}$, $C_{\hat{z}_{k+1\ int}}$
Outputs: $\tilde{z}$
Block 52:
Inputs: $\tilde{z}$
Outputs: $\tilde{z}'$
Block 53:

Inputs: $\tilde{z}'$
Outputs: $C_{\tilde{z}'}$
Block 54:
Inputs: $C_{\tilde{z}'}$
Outputs: $C_{\tilde{z}}$
Block 55:
Inputs: $C_{\tilde{z}}$
Outputs: $C_{\tilde{z}}$, and $D_{tot}$ By adding the pre-processing steps, namely the LR block 48 and SQRD block 47 and the computation of a close-to-ML although linear unconstrained estimate (block 49), a complete description of a new process is given in FIG. 5b, which achieves better performance than the Wubben detection process discussed in the first part of the present application. Note that the RDN LRA-SIC procedure block is strictly the one that has been depicted in FIG. 5a. The SQRD block 47 offers an efficient layer re-ordering that lies on the noise power and which is taken into account in the rest of the detector into the T matrix.

Block 47: (Extended SQRD)
Inputs: H, $\sigma^2$
Outputs: $Q_{ext}$, $R_{ext}$, P
Block 48: (Lattice Reduction)
Inputs: $Q_{ext}$, $R_{ext}$, P
Outputs: $\tilde{Q}_{ext}$, $\tilde{R}_{ext}$, T
Block 49: (LRA-MMSE Linear Equalizer)
Inputs: $\tilde{Q}_{ext}$, $\tilde{R}_{ext}$, T
Outputs: $\tilde{z}_{LRA-MMSE}$
Block 50: (Illustrated in FIG. 5a)
Inputs: $\tilde{z}_{LRA-MMSE}$, $\tilde{R}_{ext}$, T, K
Outputs: $C_{\tilde{z}}$, and $D_{tot}$ As a final step of the detector and in the case of a RDN-based SD, the list of possible symbols output has to be re-ordered according to the ML metrics in the original domain and duplicate solutions are removed. It is due to the presence of noise that makes some candidates to be mapped on non-legitimate constellation points in the reduced constellation, leading to this discussion when they are mapped back to the original constellation. The symbols vector associated to the minimal metric becomes the hard decision output of the detector and offers a near-ML solution.

Conclusions on Performances

The RDN LRA-MMSE-OSIC FNSA used by the process described is particularly efficient in the case of rank-deficient MIMO Systems, namely spatially correlated antennas systems, and for high order modulation which are considered points of the LTE-A norm [8].

Since the equivalent channel matrix in the LRA case is only roughly orthogonal, the mutual influence of the transformed Z is small but still present. That is the reason why a neighbourhood study in the original constellation domain improves the performance compared to a SIC. However, contrary to classical solutions that are not LRA, the necessary size for achieving the optimal performance is smaller.

FIGS. 7a to 7d respectively illustrate uncoded BER of the ODN ZF-SIC centred FNSA, of the ODN MMSE-SIC centred FNSA, of the RDN LRA-ZF-SIC centred FNSA, of the RDN LRA-MMSE-SIC, of the RDN LRA-MMSE-OSIC centred FNSA and of the ML, for K={1, 2, 3, 4}, 4×4 complex Rayleigh channel, QPSK modulation on each layer.

Some notable points have to be highlighted from FIG. 7a-7d. Contrary to the RDN LRA-ZF/MMSE-(O)SIC FNSA, the ODN ZF/MMSE-SIC FNSA do not reach the ML diversity for a reasonable neighbourhood size, even if there is a decrease of the SNR offset in the MMSE-SIC case. However, a BER offset can be observed in the low SNR range, due to error propagation. Consequently, there exists a switching point from low to high SNR between LRA detectors and others. This aspect is removed through the use of better techniques. In particular the SQRD in the RDN LRA-MMSE-OSIC FNSA offers ML diversity and the BER offset in low SNR has been importantly reduced compared to the RDN LRA-MMSE-SIC FNSA and is now close-to-ML.

It may also be noticed in FIG. 7a-7d that the RDN LRA-ZF-SIC centred FNSA does not match with the ML performance, contrary to other techniques. It is due to the chosen N(=5) value that is not sufficient for this detector that does not provide a close-to-ML enough Babai point, but that is sufficient for LRA-MMSE-(O)SIC Babai points. With a larger N value, the RDN LRA-ZF-SIC centred FNSA achieves the ML performance, similarly to other presented detectors.

Figure 8A:
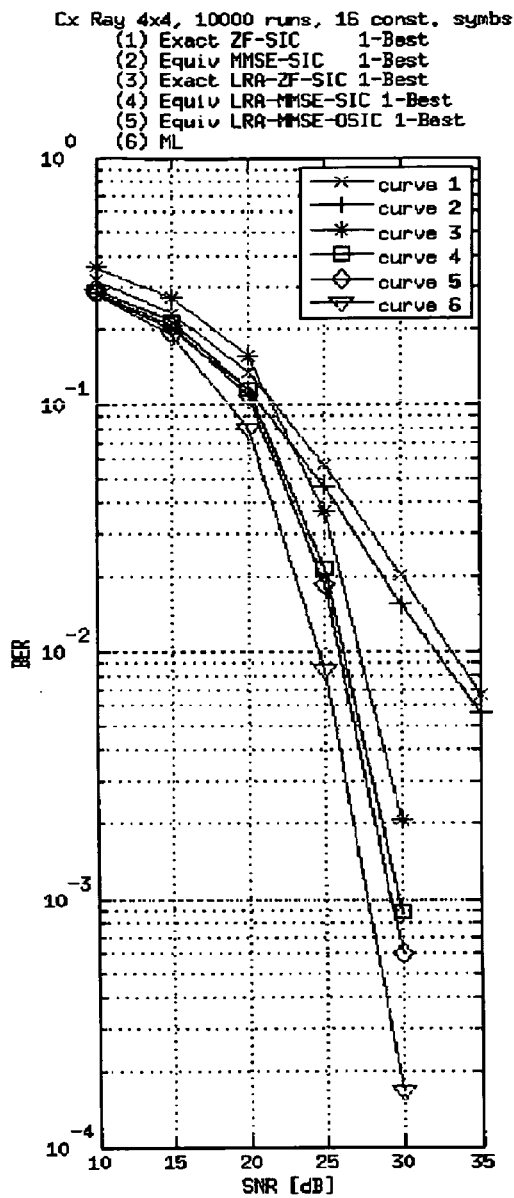
FIG. 8a-8d illustrate the uncoded BER of the ODN ZF centred FNSA, of the ODN MMSE centred FNSA, of the RDN LRA-ZF centred FNSA, of the RDN LRA-MMSE centred FNSA, of the RDN LRA-MMSE-Extended centred FNSA and of the ML, for K={1, 2, 4, 16}, 4×4 complex Rayleigh channel, 16-QAM modulation on each layer.
Figure 8B:
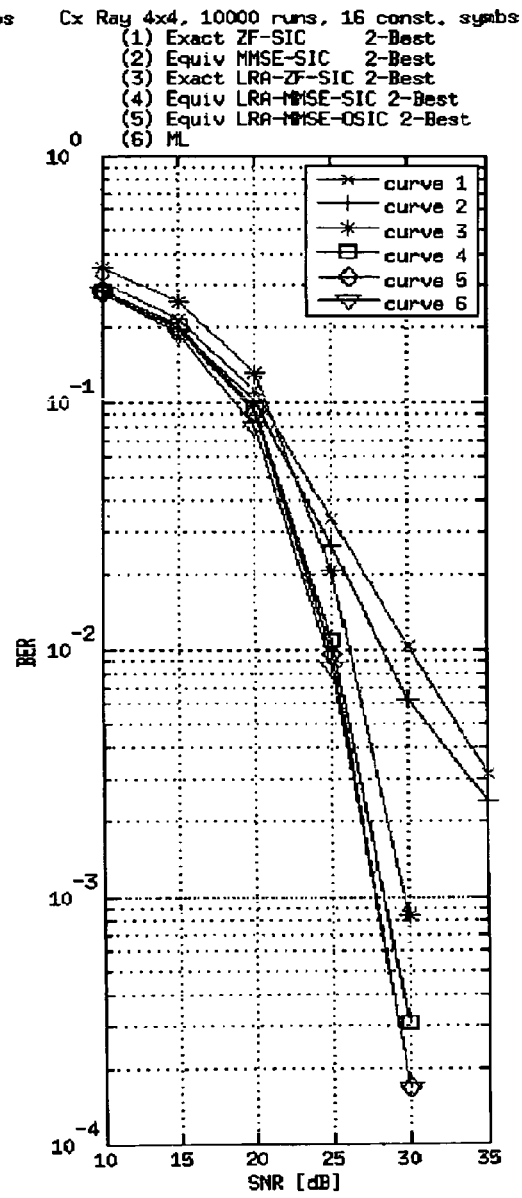
Figure 8C:
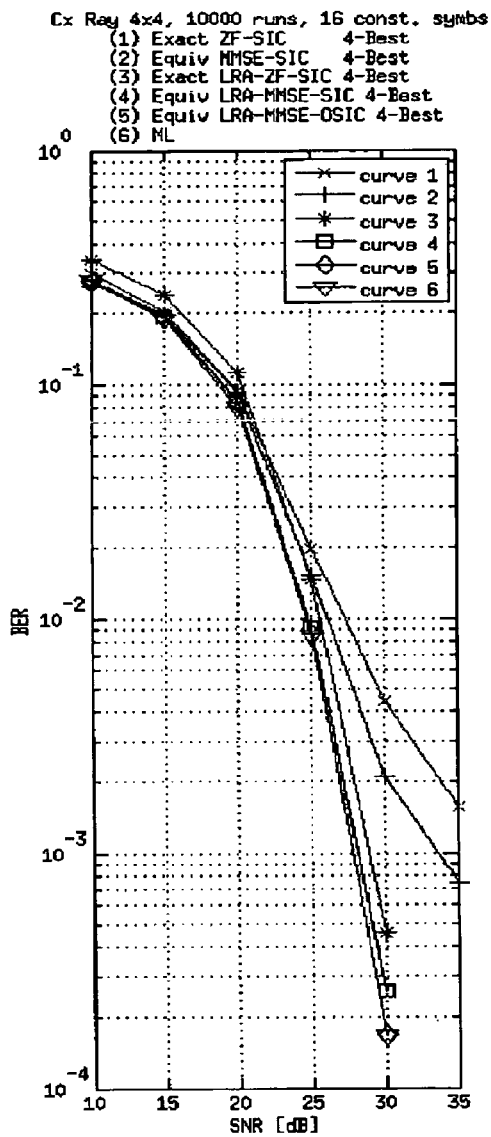
Figure 8D:
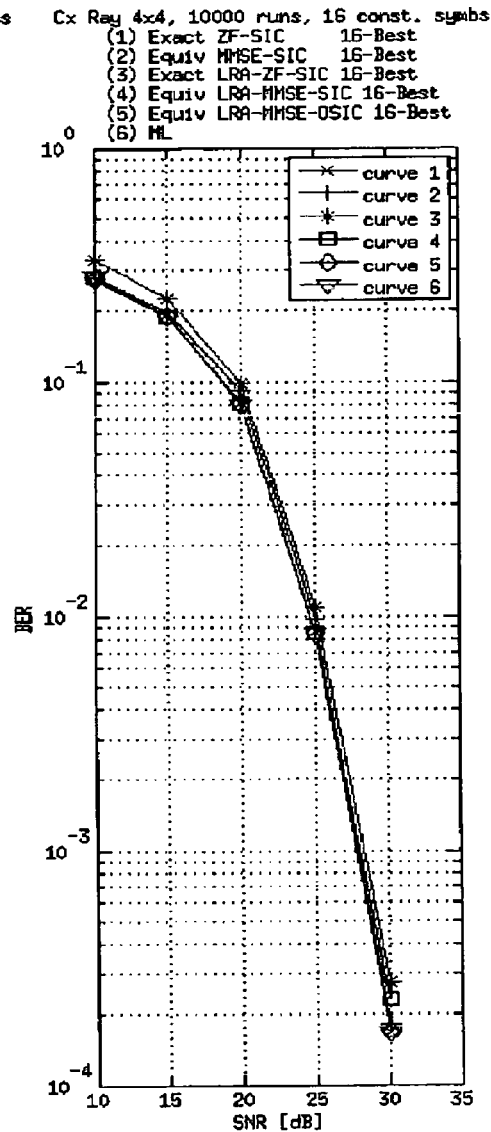

FIGS. 8a-8b particularly illustrate uncoded BER of the ODN ZF-SIC centred FNSA, of the ODN MMSE-SIC centred FNSA, of the RDN LRA-ZF-SIC centred FNSA, of the RDN LRA-MMSE-SIC centred FNSA, of the RDN LRA-MMSE-OSIC centred FNSA and of the ML, for K={1, 2, 4, 16}, 4×4 complex Rayleigh channel, 16-QAM modulation on each layer.

FIGS. 8a-8b show that there still exists a switching point from low to high SNR between LRA detectors and others. This aspect is removed through the use of better techniques. In particular, the SQRD in the RDN LRA-MMSE-OSIC FNSA offers ML diversity and the BER offset in low SNR has been importantly reduced compared to the RDN LRA-MMSE-SIC FNSA, leading now to a close-to-ML solution.

In both FIGS. 7a-d and 8a-d, and when they are not LRA, ZF-SIC and equivalent MMSE-SIC achieve the ML performance but at the price of a very large neighbourhood study size, namely of the order of the number of symbols contained in the employed constellation.

By comparing the impact on LRA detectors performance of QPSK and 16-QAM modulations, two fundamental points must be discussed.

There implicitly exists a constraint from the QPSK constellation construction that eliminates nearby lattice points that do not belong to $\xi^{n_T}$, due to the quantization operation $Q_{\xi^{n_T}}\{\bullet\}$. This aspect annihilates a large part of the LR-Aid benefit and cannot be corrected despite the increase of the neighbourhood study size since many lattice points considered in the RDN would be associated with the same constellation point after quantization in the original constellation. In the case of larger constellation orders, the LR-Aid benefit is more effective, as depicted in FIGS. 8a-8d.

Figure 9A:
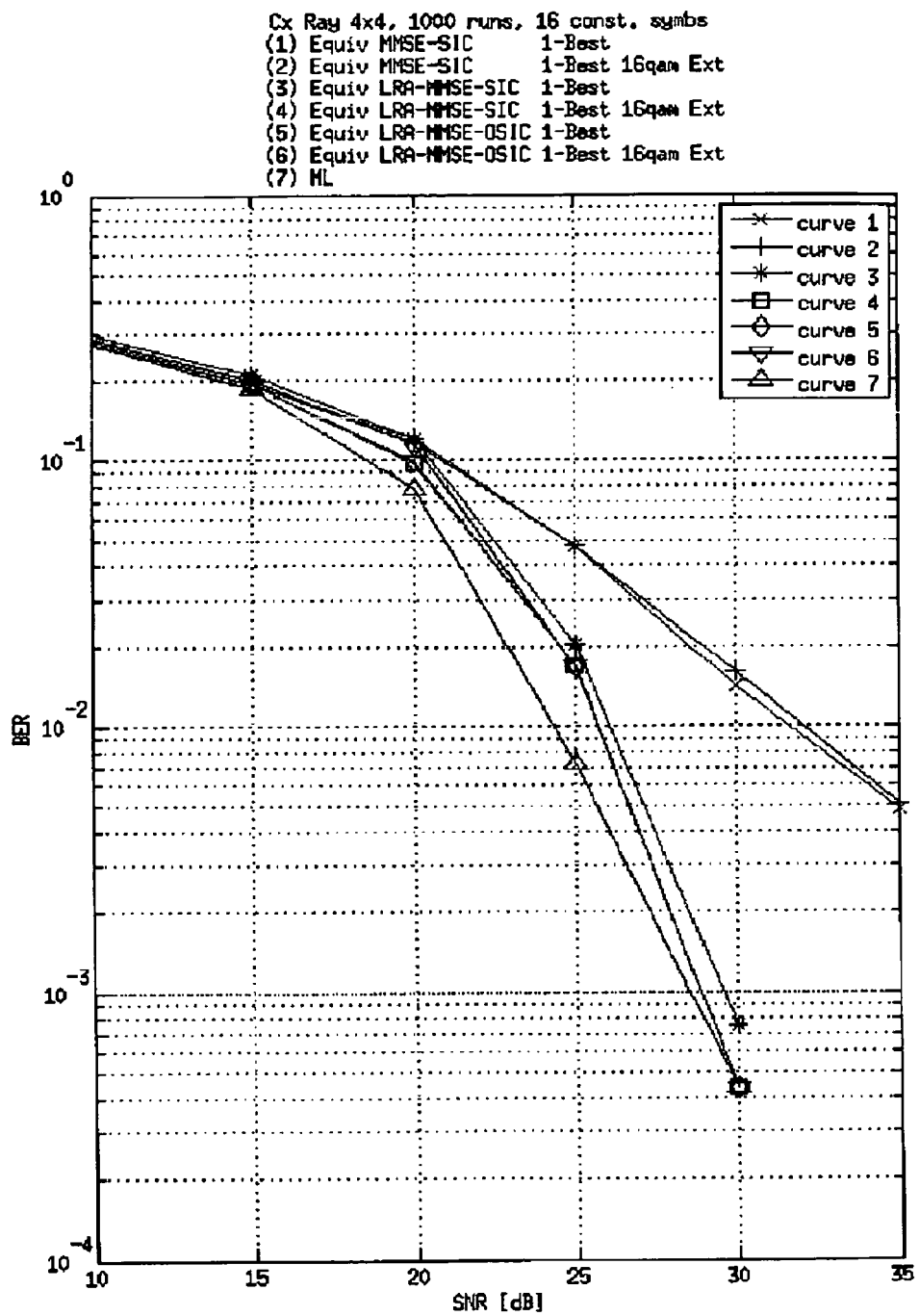
FIGS. 9a and 9b illustrate the uncoded BER of the strictly equivalent ODN MMSE centred FNSA, of the strictly equivalent RDN LRA-MMSE centred FNSA, of the strictly equivalent RDN LRA-MMSE-Extended centred FNSA, compared to the assumption respect in mean, and of the ML, for K={1, 2, 4, 16}, 4×4 complex Rayleigh channel, 16-QAM modulation on each layer. By the strictly equivalent designation, we means that the constant modulus assumption remains respected.
Figure 9B:
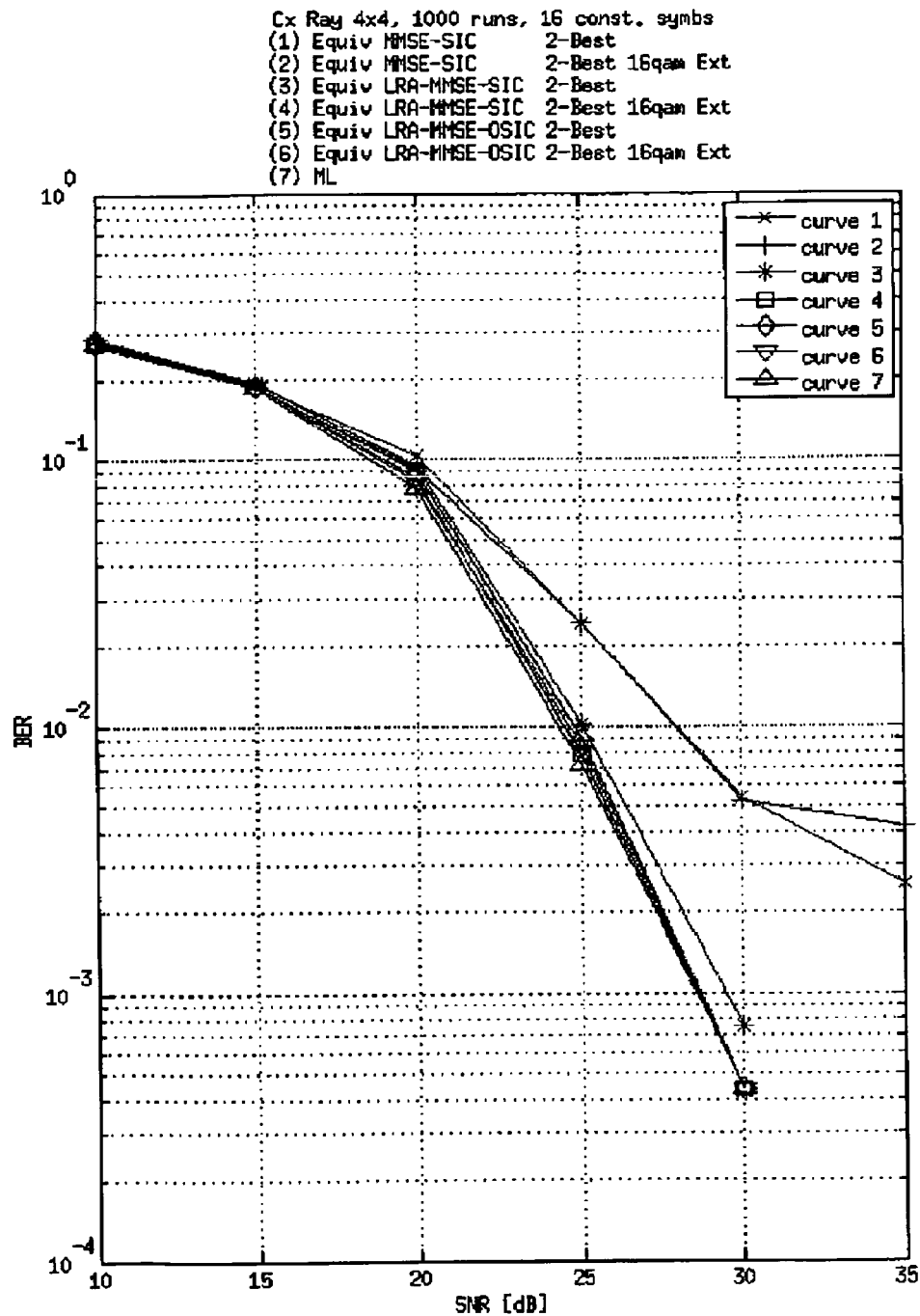

Also, the author recalls that the constant modulus constellation assumption has, in theory, to be fulfilled. It was not the case in FIG. 8 with 16-QAM modulation on each layer, by considering that the constraint would be almost respected in mean. In FIGS. 9a and 9b, the performance of R(O)DN (LRA)-MMSE-(O)SIC FNSA detectors with or without respect of the assumption are depicted, but only for a neighbourhood scan of 1 and 2 neighbours for the sake of consistency between QPSK and 16-QAM performances.

FIGS. 9a and 9b illustrate uncoded BER of the strictly equivalent ODN MMSE-SIC centred FNSA, of the strictly equivalent RDN LRA-MMSE-SIC centred FNSA, of the strictly equivalent RDN LRA-MMSE-OSIC centred FNSA, compared to the assumption respect in mean, and of the ML, for K={1, 2, 4, 16}, 4×4 complex Rayleigh channel, 16-QAM modulation on each layer.

As depicted in FIGS. 9a and 9b with 16-QAM modulations, the performance is impacted by the non-respect of the strict equivalence assumption since the term $x^H x$ (or $z^H z$) is not exactly constant but only constant in average. However, the assumption respect in not constraining and the performance loss is not redhibitory. Moreover, it is insignificant compared to the advantage of the LR-Aid in high order constellation, which would be annihilated by the use of QPSK constellations.

The proposed solution is particularly efficient for a large number of antennas and for high order constellations. It was not the case of the LRA-MMSE-OSIC that has been shown not to provide so good BER performances in 4×4 MIMO systems with a 16-QAM modulation on each layer, compared to the ML detection [9], while it was the case for 4×4 MIMO systems with QPSK modulation on each layer [7].

Complexity Considerations

By assuming the assumptions presented in Table 1, the computational complexities introduced in Table 2 can be demonstrated.

TABLE 1

Computational complexities equivalences.

| Complex operations | Real operations | MUL |
|---|---|---|
| $ADD_{CC}$ | 2ADD | 0 |
| $ADD_{RC}$ | ADD | 0 |
| $ADD_{RR}$ | ADD | 0 |
| $MUL_{CC}$ | 4MUL + 4ADD | 4 |
| $MUL_{RC}$ | 2MUL | 2 |
| $MUL_{RR}$ | 1MUL | 1 |
| $DIV_{CC}$ | 6DIV + 6ADD | 96 |
| $DIV_{RC}$ | 2DIV | 32 |
| $DIV_{RR}$ | 1DIV | 16 |
| $SQRT_{RR}$ | 1SQRT | 32 |

The RDN study is processed in an infinite lattice which would not lead to boundary control; however a finite set of displacements has been generated in a SE fashion in simulations. Its size has been fixed to an empirical value (N=5) and, although the use of a SE technique, the proposed solution does not any complexity reduction like early termination.

TABLE 2

| Technique designation | Corresponding computational complexity in MUL |
|---|---|
| ODN exact ZF-(O)SIC | $2MKn_T^2 + 2MKn_T - 4MK + 3M$ |
| ODN equivalent MMSE-(O)SIC | $2MKn_T^2 + 2MKn_T - 4MK + 3M$ |

TABLE 2-continued

| Technique designation | Corresponding computational complexity in MUL |
|---|---|
| RDN exact LRA-ZF-(O)SIC | $2N\min\{K, N\}n_T^2 + 30\min\{K, N\}n_T + 2N\min\{K, N\}n_T - 4N\min\{K, N\} + 6\min\{K, N\}n_T^2 + 4\min\{K, N\}n_R n_T + 2\min\{K, N\}n_R + 4n_T^2 - 32\min\{K, N\} + 2N$ |
| RDN equivalent LRA-MMSE-(O)SIC | $2N\min\{K, N\}n_T^2 + 30\min\{K, N\}n_T + 2N\min\{K, N\}n_T - 4N\min\{K, N\} + 6\min\{K, N\}n_T^2 + 4\min\{K, N\}n_R n_T + 2\min\{K, N\}n_R + 4n_T^2 - 32\min\{K, N\} + 2N$ |
| ML | $4n_R n_T M^{n_T}$ |

As exhibited in the table above, the computational complexities of RDN LRA-ZF/MMSE-(O)SIC FNSA detectors do not depend on the constellation order $\log_2\{M\}$. It may be checked in the numerical applications in Table 4 and it is the key point of the invention advantage over classical techniques for high order modulations such as 16(64)-QAM.

Overview of All the Aforementioned Techniques

For sake of clearness, the metrics computation formulas are summarized in Table 3.

TABLE 3

ODN conventional (O)SIC FNSA, ODN ZF-(O)SIC FNSA, ODN MMSE-(O)SIC FNSA, RDN LRA-ZF-(O)SIC FNSA, RDN LRA-MMSE-(O)SIC FNSA and ML formulas.

| Technique designation | Corresponding metric |
|---|---|
| ODN basic (O)SIC FNSA | $\|Q^H y - Rx\|^2, x \in \xi^{n_T}$ |
| ODN exact ZF-(O)SIC FNSA | $\|R(y_{ZF} - x)\|^2, x \in \xi^{n_T}$ [5] |
| ODN equivalent MMSE-(O)SIC FNSA | $(y_{MMSE} - x)^H (H^H H + \sigma^2 I)(y_{MMSE} - x), x \in \xi^{n_T}$ [3] |
| RDN exact LRA-ZF-(O)SIC FNSA | $\|\tilde{R}(z_{LRA-ZF} - z)\|^2, z \in Z_C^{n_T}$ |
| RDN equivalent LRA-MMSE-(O)SIC FNSA | $(z_{LRA-MMSE} - z)^H (\tilde{H}^H \tilde{H} + \sigma^2 T^H T)(z_{LRA-MMSE} - z), z \in Z_C^{n_T}$ |
| ML | $\|y - Hx\|^2, x \in \xi^{n_T}$ |

The SNR loss compared to ML are given in Table 4. They have been measured for an uncoded BER of $10^{-4}$ in the case of the ML decoder.

TABLE 4

ODN ZF-SIC FNSA, ODN MMSE-SIC FNSA, RDN LRA-ZF-SIC FNSA, RDN LRA-MMSE-SIC FNSA and RDN LRA-MMSE-OSIC FNSA compared to ML.

| | SNR loss (QPSK) | | | | SNR loss (16-QAM) | | | |
|---|---|---|---|---|---|---|---|---|
| Technique | K = 1 | K = 2 | K = 3 | K = 4 | K = 1 | K = 2 | K = 4 | K = 16 |
| ODN exact ZF-SIC FNSA | >7.6 | >7.6 | >7.6 | 0.36 | >5.0 | >5.0 | >5.0 | 0 |
| ODN equivalent MMSE-SIC FNSA | >7.6 | >7.6 | 6.21 | 0.30 | >5.0 | >5.0 | >5.0 | 0.09 |
| RDN exact LRA-ZF-SIC FNSA | 4.43 | 2.90 | 1.92 | 1.71 | 3.21 | 2.04 | 1.27 | 0.62 |
| RDN equivalent LRA-MMSE-SIC FNSA | 2.90 | 0.73 | 0.52 | 0.27 | 2.12 | 0.76 | 0.53 | 0.40 |
| RDN equivalent LRA-MMSE-OSIC FNSA | 0.80 | 0.01 | 0 | 0 | 1.62 | 0.02 | 0 | 0 |

For all the configurations given in Table 4, the numerical application of the corresponding computational complexity is given in Table 5 for a RDN size N=5.

TABLE 5

ODN ZF-SIC, ODN MMSE-SIC, RDN LRA-ZF-SIC, RDN LRA-MMSE-SIC, RDN LRA-MMSE-OSIC and ML computational complexities in MUL.

| | MUL (QPSK) | | | | MUL (16-QAM) | | | |
|---|---|---|---|---|---|---|---|---|
| Technique | K = 1 | K = 2 | K = 3 | K = 4 | K = 1 | K = 2 | K = 4 | K = 16 |
| ODN ZF-(O)SIC FNSA | 156 | 300 | 444 | 588 | 624 | 1200 | 2352 | 9264 |
| ODN MMSE-(O)SIC FNSA | 156 | 300 | 444 | 588 | 624 | 1200 | 2352 | 9264 |
| RDN LRA-ZF-(O)SIC FNSA | 510 | 946 | 1382 | 1818 | 510 | 946 | 1818 | 2254 |
| RDN LRA-MMSE-(O)SIC FNSA | 510 | 946 | 1382 | 1818 | 510 | 946 | 1818 | 2254 |
| ML | | 16384 | | | | 4194304 | | |

Even if the proposed solution is two times more complex in the QPSK case, it offers near-ML performance and in particular a SNR gain of 0.3 dB at a BER of $10^{-4}$. The interesting point concerns higher order modulations: starting from the 16-QAM modulation, the estimated complexity of the proposed solution is ten times less complex than the classical one, for the same performance result. Identically, the performance is expected to be the same for a 64-QAM modulation, with the same complexity. In such a case, the complexity gain will increase importantly, in this particular case it is decreased of about a hundred times.

Similarly, the numerical application of the 16-QAM extension computational complexity is given in Table 6.

TABLE 6

ODN MMSE-SIC, RDN LRA-MMSE-SIC and RDN LRA-MMSE-OSIC computational complexities in MUL.

| | MUL (16-QAM extension) | | | | MUL (16-QAM) | | | |
|---|---|---|---|---|---|---|---|---|
| Technique | K = 1 | K = 2 | K = 3 | K = 4 | K = 1 | K = 2 | K = 4 | K = 16 |
| ODN equivalent MMSE-(O)SIC FNSA | 560 | 1120 | 1680 | 2240 | 624 | 1200 | 2352 | 9264 |
| RDN equivalent LRA-MMSE-(O)SIC FNSA | 1694 | 3122 | 4550 | 5978 | 510 | 946 | 1818 | 2254 |

As an example, in the case of 16-QAM modulations, the computational complexities read $8MKn_T^2+4MKn_T-4MK+3M$ for the ODN equivalent MMSE-(O)SIC and $8N \min\{K,N\}n_T^2+60 \min\{K,N\}n_T+4N \min\{K,N\}n_T-4N \min\{K,N\}+24 \min\{K,N\}n_T^2+8 \min\{K,N\}n_R n_T+2 \min\{K,N\}n_R+16n_T^2-32 \min\{K,N\}+2N$ for the RDN equivalent LRA-MMSE-(O)SIC, and with M=4 since a QPSK modulation is considered in this case.

As depicted in Table 6, the computational complexity is more important and consequently does not offer an effective solution.

II. Description of One Particular Embodiment

Figure 6:
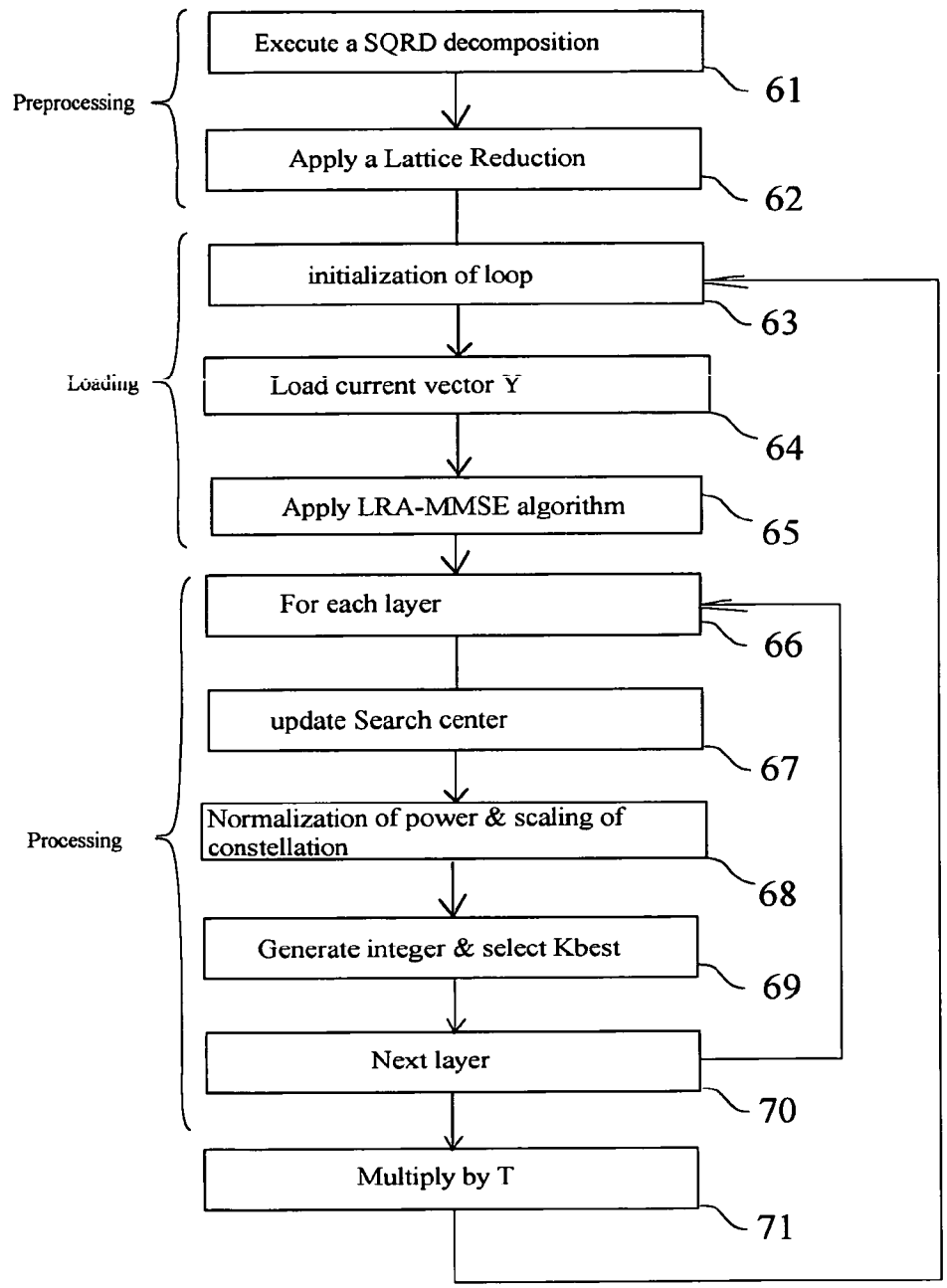
FIG. 6 illustrates one embodiment of a process for achieving MIMO near-ML detection.
Figure 7A:
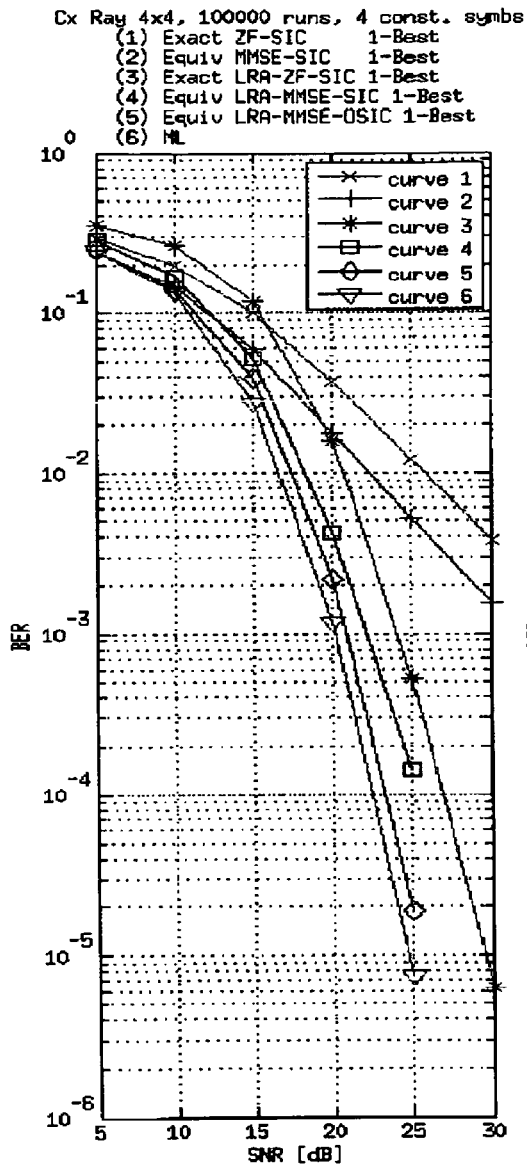
FIGS. 7a-7d illustrate the uncoded Bit Error Rate (BER) of the ODN ZF centred FNSA, of the ODN MMSE centred FNSA, of the RDN LRA-ZF centred FNSA, of the RDN LRA-MMSE, of the RDN LRA-MMSE-Extended centred FNSA and of the ML, for K={1, 2, 3, 4}, 4×4 complex Rayleigh channel, QPSK modulation on each layer.
Figure 7B:
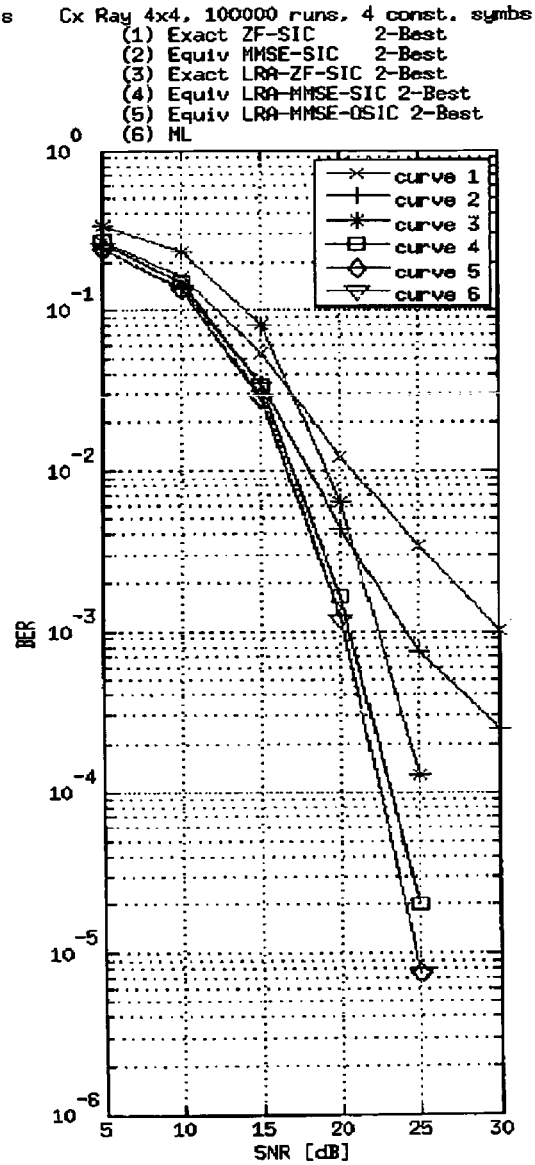
Figure 7C:
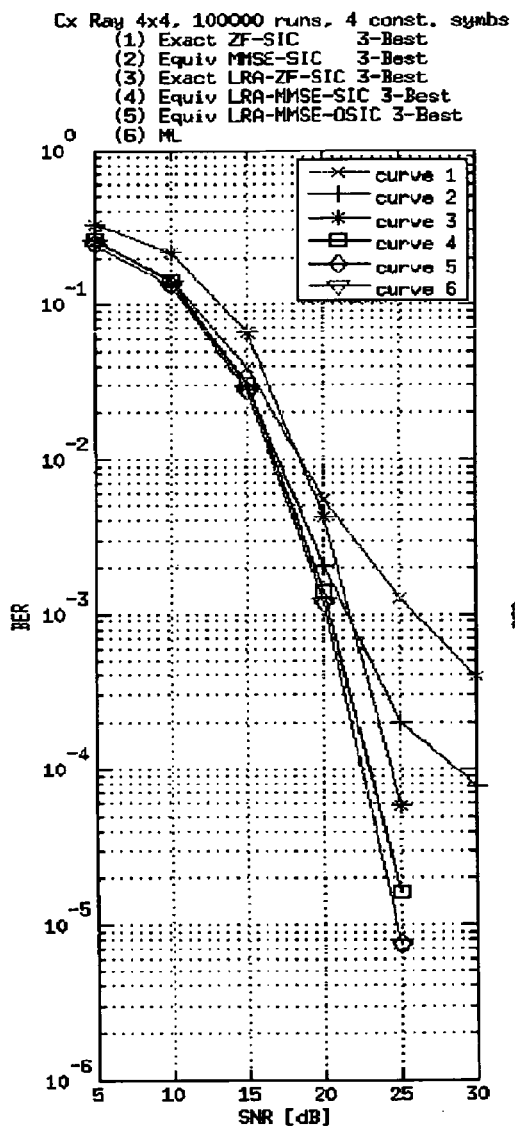
Figure 7D:
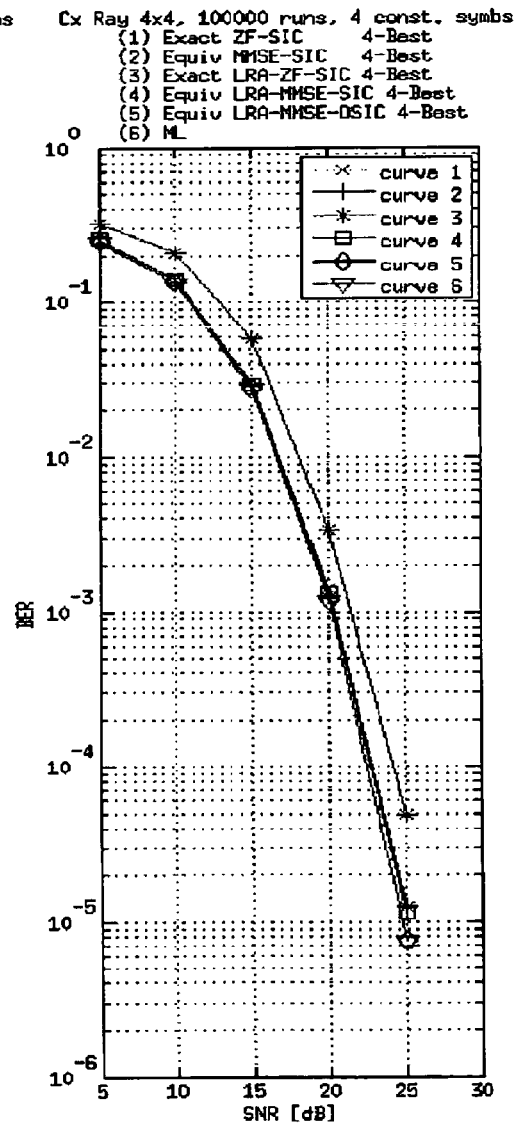

With respect to FIG. 6, there will now be described one particular embodiment of a process which carries out the functional blocks illustrated in FIGS. 4 and 5a and 5b.

As described above, the particular embodiment successively involves a preprocessing phase (A)—only depending on the channel—, then followed by an loading phase (B) for processing the received observations and then completed by a phase of neighborhood search (C) for the purpose of achieving the detection.

A. Preprocessing

The preprocessing phase starts with the assumption of the knowledge of the channel H which can be determined by any conventional means, such as for instance by the use of pilot or reference signals.

Also, it is assumed that the variance of the noise ($\sigma^2$) is known.

Such parameters may be determined, for instance, after the receipt of a frame of symbols and can be repeatedly performed as soon as the channel varies.

The process then starts with a step 61 which consists in an SQRD decomposition in accordance with any conventional means. In one particular embodiment, the SQRD decomposition is particularly applied to a Hext channel which takes into account the noise contribution, that is to say according to the model below from the formula 10:

$$H_{ext} = \begin{bmatrix} H \\ \sigma I \end{bmatrix} \text{ and } y_{ext} = \begin{bmatrix} y \\ 0 \end{bmatrix}$$

Step 1 then results in the generation of the following three parameters: $Q_{ext}$, $R_{ext}$, and P, with P being a permutation matrix.

Then the process proceeds to a step 62 where a lattice reduction is applied for the purpose of improving the conditioning of the two components ($Q_{ext}$, $R_{ext}$) of the channel matrix.

For that purpose, the embodiment uses more particularly the Korkine-Zolotareff or Lenstra-Lenstra-Lovasz (LLL) algorithm.

Step 62 thus issues the following variables $\tilde{Q}_{ext}$, $\tilde{R}_{ext}$, T with T being a permutation matrix which takes into account the permutations already accounted with matrix P, plus the additional changes resulting from the lattice reduction. As recalled in Wubbens reference, such matrix only includes complexes having real and imaginary parts being integers and has a determinant which absolute value is equal to 1.

This completes the pre-processing phase which only takes into account the H channel.

B. Loading Phase

The so-called loading phase includes the processing of a determined number n of observation vectors y, with n depending on how varies the channel H. Generally speaking, when H is subject to fast variations (for instance because the mobile is moving within the cell), then the number n of observations will be reduced so as to allow more frequent update of the channel. Conversely, if the channel shows to be quite stable, then the number of observations Y to be loaded with the results of a same preprocessing phase A may be increased. Many variations may be considered for determining the proper number of observations to be considered during phase B. For instance, the consideration of the number of positive or negative acknowledgment may be used for determining whether the channel is rapidly changing, thus resulting in the need of initiating a new preprocessing phase. Such particular aspect is not part of the present invention and will not be further elaborated.

The loading phase starts with a step 63, which is the initialization of a loop for the purpose of loading successive observations, e.g. a set of n vectors Y.

Then, in a step 64, the process proceeds with the loading of the current observation vector y.

Then, in a step 65, the process proceeds with the execution of a Linear equalization which, in the particular embodiment being considered is based on a Lattice Reduction aided MMSE algorithm.

$\tilde{z}_{LRA\text{-}MMSE}$

C. Processing Phase (Search of Neighborhood)

The third phase corresponds to the end of the so-called LOADING phase, and starts the real detection process. While the second phase was simply based on a linear equalization, that means the multiplication by a matrix, phase C now leads to a detection of the transmitted symbol.

In the Wubben's article, the detection is based—taking advantage of the triangular shape of the R matrix in the QR decomposition—on the use of a Successive Interference Canceller (SIC) for achieving quantification and thus the detection process.

Conversely, the embodiment which is now described deviates from that conventional teaching in that a neighborhood search is investigated in order to yield a predetermined number of possible symbols.

More particularly, in the embodiment which is considered, the result of phase B above is used for deriving the search center for the neighborhood search.

This results in the fact that the search is no longer performed in the original constellation, but is executed in "z" constellation resulting from a lattice reduction while WANG, in FIG. 1 of the above mentioned reference, starts the search from the result of $\tilde{x}$.

Step 66 is the start of a FOR loop for the purpose of processing all the layers of the received symbols.

In a step 67, the process performs a search center update which particularly takes into account the value of the previous step 65 yielding $\tilde{z}_{LRA\text{-}MMSE}$ and also the result of the previous iteration on the last layers.

Then, in a step 68, the process proceeds with a shift and divide operation is applied on the value of the search center so as to achieve basic normalization of the power and scaling of the constellation.

Then, in a step 69, the process proceeds with the generation, for each layer, of all symbols to be investigated. Thanks to the previous shift-normalization step, such generation is based on the consideration of integers around the sphere center. The process then generates a list of integers and the computation of the partial Euclidean Distance with respect to the considered Sphere Center $\tilde{z}_{LRA\text{-}MMSE}$, in accordance with the formula:

$$\|\tilde{R}(\tilde{z}_{LRA\text{-}MMSE} - Z)\|^2 < d^2$$

The above generation of integer causes the selection of a predetermined number K of the integers giving the small PED distance hereinafter designated as the K-best solutions.

In one alternative embodiment, the process directly generates a list of ordered symbols giving increasing PED value, so that the selection of the K-best solutions is simply based on the generation of the first K values of the ordered list.

Different algorithms can be used for the purpose of generating the K-best, such as, for instance the so-called SCHNORR-EUCHNER algorithm.

In one particular embodiment, the process generates a set of 10 K-best possible integers per layer.

Then, in a step 70, the process proceeds to the processing of the next layer, and loops back to step 66 again.

When all the layers have been computed, then the process proceeds to a step 71 where the estimated value $\hat{z}$ is multiplied by the matrix T;

then followed by a quantization in the the original constellation comprising a presumably known dictionary of symbols so as to generate the estimated value $\hat{x}$ after quantization.

When the set of n observations vectors has been processed, then the process initializes a again for the purpose of performing a new pre-processing of the next frame.

Advantages of the Invention

Any OFDM standard supporting MIMO spatial-multiplexing mode, e.g. IEEE 802.16, IEEE 802.11, 3GPP LTE and 3GPP LTE-A, are linked to the invention. The invention is particularly advantageous in the case of a large number of antennas and consequently in the case of the 3GPP LTE-A standard.

The main advantage in the use of the generalized SD algorithm, to which this invention relates, is a performance improvement for a given neighbourhood size or a reduction of the neighbourhood size for a given BER goal and provides an advantage over competition in the popular MIMO-OFDM background:

The equivalent expression of the LRA-MMSE centred SD, which corresponds to an efficient LRA-MMSE-SIC Babai point, has been proposed in order to improve the performance or reduce the complexity of the detector, which was is not the case before;

The (S)QRD has been introduced in formulas, which induces the use of the best known hard detector as a Babai point, as well for large number of antennas as for high order modulations;

The proposed expression is robust by nature to any search centre and constellation order and offers close-to-optimal performance is large K cases;

The invention offers a computational complexity that is independent of the constellation order which consequently offers a solution that outperforms classical SD techniques for a reasonable computational complexity in the case of high order constellations;

The neighbourhood study size K has been reduced compared to classical SD techniques in particular K=2 for a 16-QAM modulation;

The quasi-optimum performance is achieved with the proposed invention.

REFERENCES

[1] B. M. Hochwald, and S. Ten Brink, "Achieving near-capacity on a multiple-antenna channel," *Communications, IEEE Transactions on*, vol. 51, no. 3, pp. 389-399, March 2003.

[2] T. Cui, and C. Tellambura, "An efficient generalized sphere decoder for rank-deficient MIMO systems," *Communications Letters, IEEE*, vol. 9, no. 5, pp. 423-425, May 2005.

[3] L. Wang, L. Xu, S. Chen, and L. Hanzo, "MMSE Soft-Interference-Cancellation Aided Iterative Center-Shifting K-Best Sphere Detection for MIMO Channels," *Communications, IEEE International Conference on*, pp. 3819-3823, May 2008.

[4] X.-F. Qi, and K. Holt, "A Lattice-Reduction-Aided Soft Demapper for High-Rate Coded MIMO-OFDM Systems," *Signal Processing Letters, IEEE*, vol. 14, no. 5, pp. 305-308, May 2007.

[5] K.-W. Wong, Tsui, S.-K. Cheng, and W. H. Mow. "A VLSI Architecture of a K-Best Lattice Decoding Algorithm For MIMO Channels," *Circuits and Systems, IEEE International Symposium on*, vol. 3, pages 273-276, May 2002.

[6] J. Jalden, and P. Elia, "LR-aided MMSE lattice decoding is DMT optimal for all approximately universal codes," *Information Theory, IEEE International Symposium on*, pp.1263-1267, June 2009.

[7] D. Wübben, R. Böhnke, V. Kühm, and K.-D. Kammeyer, "Near-Maximum-Likelihood Detection of MIMO Systems using MMSE-Based Lattice-Reduction," *Communications, IEEE International Conference on*, vol. 2, pp. 798-802, 2004.

[8] E.-U. Technical Specification Group RAN, "36.101 User Equipment (UE) radio transmission and reception v8.8.0," Tech. Rep., September 2009.

[9] X. Wang, Z. He, K. Niu, W. Wu, and X. Zhang, "An Improved Detection Based on Lattice Reduction in MIMO Systems," *Personal, Indoor and Mobile Radio Communications, IEEE International Symposium on*, pp. 1-5, September 2006.

The invention claimed is:

1. Detection process for a receiver of a wireless communication system based on Multiple-In-Multiple-Out antennas, said receiver processing observations symbols y derived from symbols x transmitted by an emitter through a channel H; said process comprising:
   a preprocessing which only depends on the channel H, said preprocessing involving:
      A QRD decomposition for the purpose of decomposing said channel H into two Q and R matrices, with $Q^H Q = I$ and R being upper triangular;
      a lattice reduction for the purpose of generating $\tilde{Q}, \tilde{R}$ and a permutation matrix T comprising complexes values having real and imaginary parts being integers and a determinant which absolute value is equal to 1;
   a loading phase comprising a linear LRA-Minimum-Mean-Square-Error equalization applied on said symbols y in accordance with the result of said lattice reduction for the purpose of generating a value $\tilde{z}_{LRA\text{-}MMSE}$ given by the formula below:

$$\tilde{z}_{LRA\text{-}MMSE} = (\tilde{H}^H \tilde{H} + \sigma_n^2 T^H T)^{-1} \tilde{H}^H y;$$

wherein said process further involves the steps of:
   performing a neighborhood search with a search center being equal to the result $\tilde{z}_{LRA\text{-}MMSE}$ of said lattice reduction;
   determining the K-Best symbols in accordance with a Partial Euclidean Distance (PED) defined in accordance with the following formula:

$$\|\tilde{R}(\tilde{z}_{LRA\text{-}MMSE} - Z)\|^2 < d^2$$

detecting each layer and with the result of said detection performing an update of the search center so as to perform detection of the next layer;
multiplying the estimated value $\hat{Z}$ by said matrix T;
performing a quantization in the original constellation comprising a dictionary of symbols presumably known to the receiver so as to generate the estimated value $\hat{X}$.

2. Process according to claim 1 wherein it involves said preprocessing phase is applied on an extended model of the matrix H defined in accordance with the following formula:

$$H_{ext} = \begin{bmatrix} H \\ \sigma I \end{bmatrix} \text{ and } y_{ext} = \begin{bmatrix} y \\ 0 \end{bmatrix};$$

with H being the channel matrix, a being the noise standard deviation, I being the identity matrix.

3. Process according to claim 2 wherein said lattice reduction is based on a Lenstra-Lenstra-Lovasz algorithm.

4. Process according to claim 1 wherein said SQRD decomposition is a sorted QRD decomposition, with the rows of said upper triangular matrix that are sorted in accordance with the level of the Signal-to-Interference and Noise Ratio, said SQRD decomposition issuing $Q_{ext}$, $R_{ext}$ and a permutation matrix P.

5. Process according to claim 4 wherein said lattice reduction algorithm generates the following outputs, $\tilde{O}_{ext}$, $\tilde{R}_{ext}$, and T with T being a permutation matrix which takes into account the permutations already accounted with matrix P, plus the additional changes resulting from the lattice reduction step.

6. Process according to claim 5 wherein processing phase comprises the use of the value of $\tilde{z}_{LRA\text{-}MMSE}$ for the purpose of deriving a search center for a neighborhood search with a selection of the K-Best symbols; and
   a shift and divide operation is applied on the value of the search center so as to achieve basic normalization of the power and scaling of the constellation;
   the generation of a sorted list of symbols associated with the K smallest PEDs, said ordered list being generated by studying a neighborhood in accordance with the SCHNORR-EUCHNER algorithm;
   the determination of the estimated value $\hat{z}$, and
   the multiplication of the estimated value $\hat{z}$ by said matrix T plus a quantization step for the purpose of generating the estimated value $\hat{x}$.

7. Process according to claim 6 wherein said processing phase involves the selection of a set of 2-best symbols.

8. Receiver for a wireless communication system based on Multiple-In-Multiple-Out antennas, said receiver processing observations symbols y derived from symbols x transmitted by an emitter through a channel H; said receiver comprising:
   means for performing a preprocessing which only depends on the channel H and which further comprises:
      means for performing a QRD decomposition for the purpose of decomposing said channel H into two Q and R matrices, with $Q^H Q = I$ and R being upper triangular;
      means for performing a lattice reduction for the purpose of generating $\tilde{Q}, \tilde{R}$ and a permutation matrix T comprising complexes values having real and imaginary parts being integers and a determinant which absolute value is equal to 1;
   means for performing a loading phase comprising a linear LRA-Minimum-Mean-Square-Error equalization applied on said symbols Y in accordance with the result of said lattice reduction for the purpose of generating a value $\tilde{z}_{LRA-MMSE}$ given by the formula below:

$$\tilde{z}_{LRA-MMSE}=(\tilde{H}^H\tilde{H}+\sigma_n^2 T^H T)^{-1}\tilde{H}^H y;$$

wherein it further includes:
- means for performing a neighborhood search with a search center being equal to the result $\tilde{z}_{LRA-MMSE}$ of said lattice reduction;
- means for determining the K-Best symbols in accordance with a Partial Euclidean Distance (PED) defined in accordance with the following formula:

$$\|\tilde{R}(\tilde{z}_{LRA-MMSE}-Z)\|^2 < d^2$$

- means for detecting each layer and with the result of said detection performing an update of the search center so as to perform detection of the next layer;
- means for multiplying the estimated value $\tilde{z}$ by said matrix T and means for performing a quantization step onto the original constellation comprising a dictionary of symbols presumably known to the receiver so as to generate the estimated value $\hat{x}$.

9. Receiver according to claim 8 wherein it the preprocessing phase is applied on an extended model of the matrix H defined in accordance with the following formula:

$$H_{ext} = \begin{bmatrix} H \\ \sigma I \end{bmatrix} \text{ and } y_{ext} = \begin{bmatrix} y \\ 0 \end{bmatrix};$$

With H being the channel matrix, a being the noise standard deviation, I being the identity matrix.

10. Receiver according to claim 9 wherein said lattice reduction is based on a Lenstra-Lenstra-Lovasz algorithm.

11. Receiver according to claim 8 wherein it includes means for performing a sorted QRD decomposition, with the rows of said upper triangular matrix that are sorted in accordance with the level of the Signal-to-Interference and Noise Ratio, said SQRD decomposition issuing $Q_{ext}$, $R_{ext}$ and a permutation matrix P.

12. Receiver according to claim 11 wherein said lattice reduction algorithm generates the following outputs $\tilde{Q}_{ext}$, $\tilde{R}_{ext}$, and T with T being a permutation matrix which takes into account the permutations already accounted with matrix P, plus the additional changes resulting from the lattice reduction.

13. Receiver according to claim 12 wherein processing phase comprises the use of the value of $\tilde{z}_{LRA-MMSE}$ for the purpose of deriving a search center for a neighborhood search with a selection of the K-Best symbols; and that it includes:
- means for performing a shift and divide operation is applied on the value of the search center so as to achieve basic normalization of the power and scaling of the constellation;
- means for generating a sorted list of symbols associated with the the K smallest PEDs, said ordered list being generated by studying a neighborhood in accordance with the SCHNORR-EUCHNER algorithm;
- means for detecting said estimated value $\hat{z}$, and means for multiplying said value by said matrix T plus a quantification onto the original constellation for the purpose of generating the estimation of said value $\hat{x}$.

14. Receiver according to claim 13 wherein the processing phase is based on the selection of a set of 2-best symbols.

15. User equipment comprising the receiver defined in accordance with claim 8.

* * * * *